(12) United States Patent
Holliman et al.

(10) Patent No.: US 10,129,538 B2
(45) Date of Patent: Nov. 13, 2018

(54) METHOD AND APPARATUS FOR DISPLAYING AND VARYING BINOCULAR IMAGE CONTENT

(71) Applicant: RealD Inc., Beverly Hills, CA (US)

(72) Inventors: Nicolas S. Holliman, Durham (GB); Michael G Robinson, Boulder, CO (US)

(73) Assignee: RealD Inc., Beverly Hill, CA (US)

( * ) Notice: Subject to any disclaimer, the term of this patent is extended or adjusted under 35 U.S.C. 154(b) by 221 days.

(21) Appl. No.: 14/768,824

(22) PCT Filed: Feb. 19, 2014

(86) PCT No.: PCT/US2014/017214
§ 371 (c)(1),
(2) Date: Aug. 19, 2015

(87) PCT Pub. No.: WO2014/130584
PCT Pub. Date: Aug. 28, 2014

(65) Prior Publication Data
US 2016/0007016 A1    Jan. 7, 2016

Related U.S. Application Data

(60) Provisional application No. 61/766,599, filed on Feb. 19, 2013.

(51) Int. Cl.
*H04N 7/18* (2006.01)
*H04N 13/398* (2018.01)
(Continued)

(52) U.S. Cl.
CPC ......... *H04N 13/398* (2018.05); *H04N 13/128* (2018.05); *H04N 13/383* (2018.05)

(58) Field of Classification Search
CPC .................................................. H04N 13/0497
(Continued)

(56) References Cited

U.S. PATENT DOCUMENTS 4,634,384 A     1/1987  Neves et al.
5,583,795 A  *  12/1996  Smyth ................... A61B 3/0025
                                                              359/630
(Continued)

FOREIGN PATENT DOCUMENTS

CN       102842301 A     12/2012
EP          641132 A1      3/1995
(Continued)

OTHER PUBLICATIONS

Active Vision, Findlay and Gilchrist, OUP, 2003.
(Continued)

*Primary Examiner* — Leron Beck
(74) *Attorney, Agent, or Firm* — Penny L. Lowry; Neil G. Mothew

(57) ABSTRACT

A controller that may implement variation of the content of binocular images which may depend upon which region of a binocular image a viewer is fixating. An aspect of the present disclosure may include locally controlling the viewer's perceived depth impression which may depend on where in perceived depth in an image the viewer is fixating. This may enable the perceived depth to be optimized across the image for quality and performance reasons.

18 Claims, 29 Drawing Sheets

(51) Int. Cl.
*H04N 13/128* (2018.01)
*H04N 13/383* (2018.01)

(58) Field of Classification Search
USPC .......................................................... 348/78
See application file for complete search history.

(56) References Cited

U.S. PATENT DOCUMENTS

| | | | |
|---|---|---|---|
| 6,198,484 B1 | 3/2001 | Kameyama | |
| 6,414,681 B1* | 7/2002 | Ohshima | G06F 3/012 |
| | | | 345/428 |
| 6,798,406 B1 | 9/2004 | Jones et al. | |
| 7,675,513 B2* | 3/2010 | Holland | H04N 13/0275 |
| | | | 345/418 |
| 7,983,477 B2 | 7/2011 | Holliman et al. | |
| 8,300,089 B2 | 10/2012 | Robinson | |
| 2006/0210111 A1* | 9/2006 | Cleveland | G01C 3/14 |
| | | | 382/103 |
| 2010/0039504 A1* | 2/2010 | Takahashi | G02B 27/0025 |
| | | | 348/54 |
| 2010/0017169 A1 | 7/2010 | Son et al. | |
| 2011/0228051 A1* | 9/2011 | Dedeoglu | H04N 13/0022 |
| | | | 348/46 |
| 2012/0081661 A1* | 4/2012 | Yamakaji | G01M 11/0257 |
| | | | 351/159.76 |
| 2012/0133645 A1* | 5/2012 | Jung | H04N 13/0011 |
| | | | 345/419 |
| 2012/0287405 A1* | 11/2012 | Mousset | G01M 11/0228 |
| | | | 351/246 |
| 2014/0218488 A1* | 8/2014 | Didyk | H04N 13/0022 |
| | | | 348/51 |

FOREIGN PATENT DOCUMENTS

| | | |
|---|---|---|
| EP | 2701390 A2 | 2/2014 |
| KR | 10-2007-0061091 A | 6/2007 |
| KR | 10-2009-0020892 A | 2/2009 |
| KR | 10-1046259 B1 | 7/2011 |
| WO | 2013018004 A1 | 2/2013 |

OTHER PUBLICATIONS

Basic Vision, Snowden, Thompson, Troscianko, OUP, 2006.
International search report and written opinion of international searching authority in co-pending PCT/US2014/017214, dated May 29, 2014.
Extended European Search Report for EP Application No. 14754036.3, dated Jul. 27, 2016.
First Office Action for Chinese Application No. 201480022341.7, dated Sep. 20, 2016.

* cited by examiner

Fig. 2
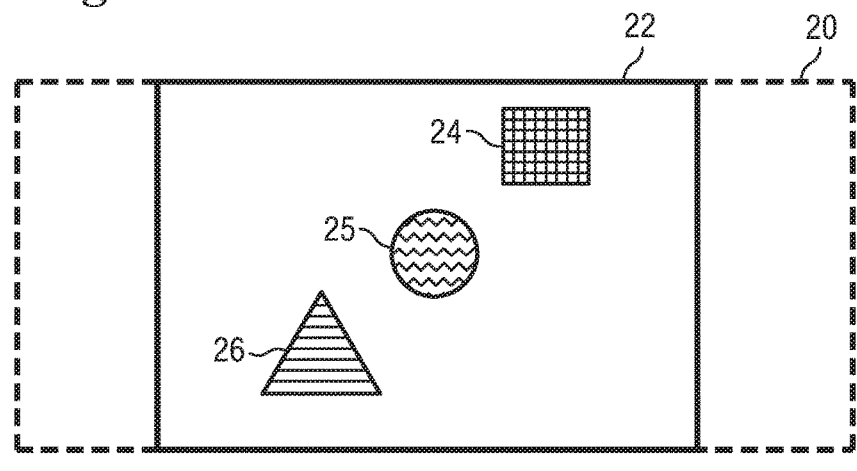
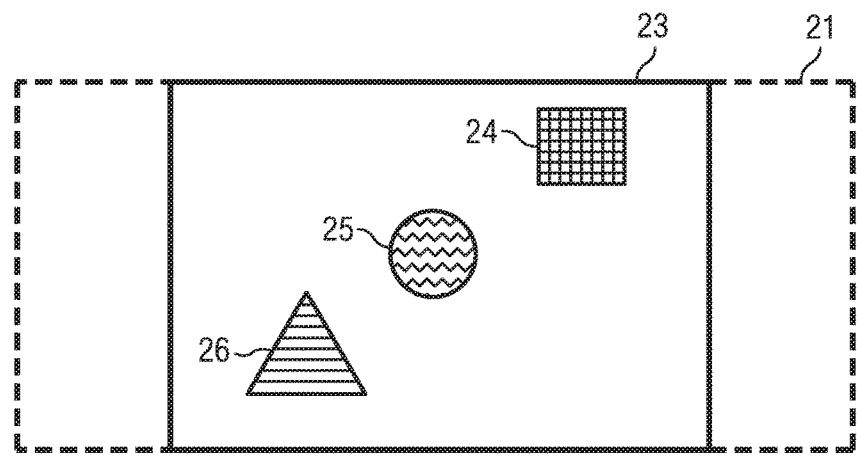

Fig. 4
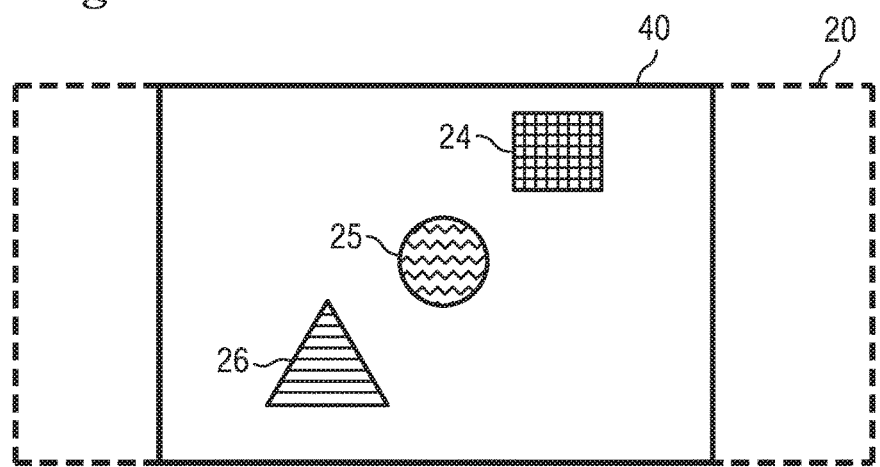
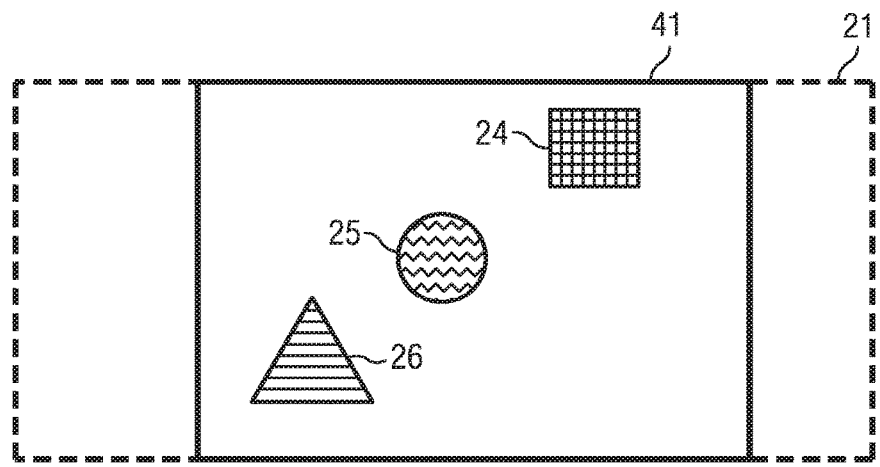

Fig. 7
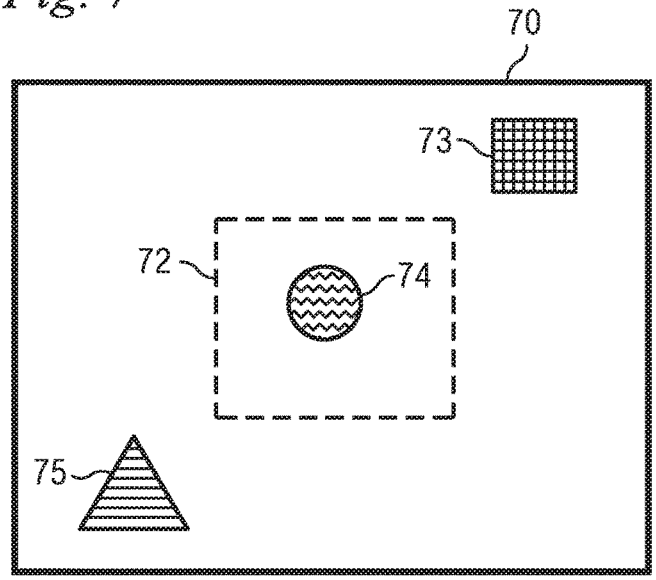
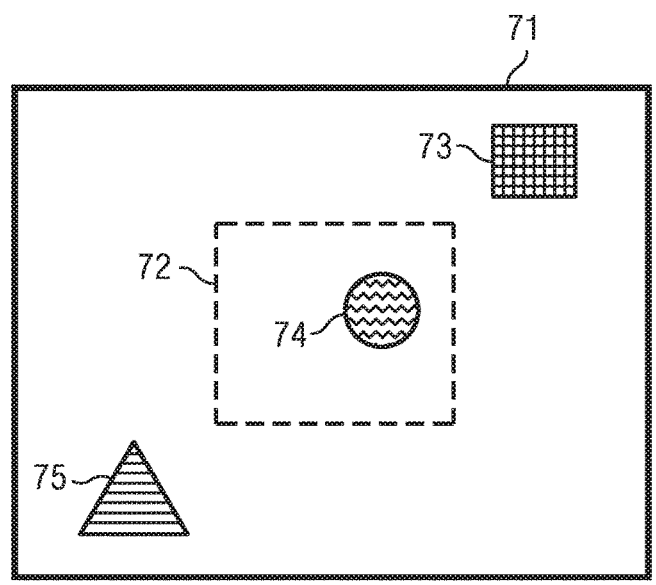

Fig. 9
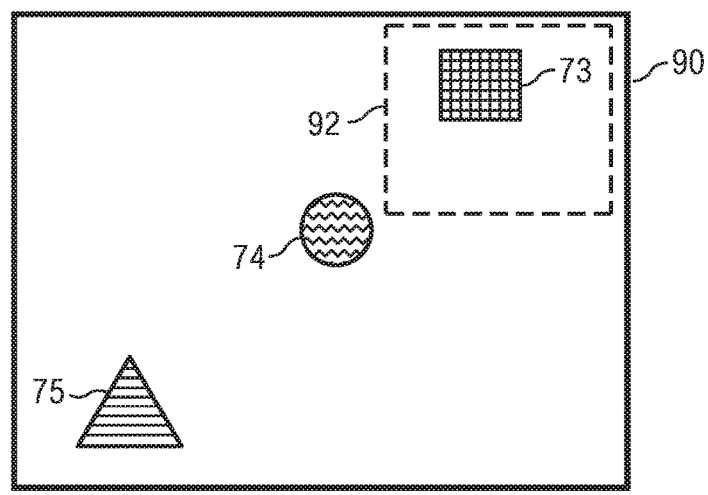
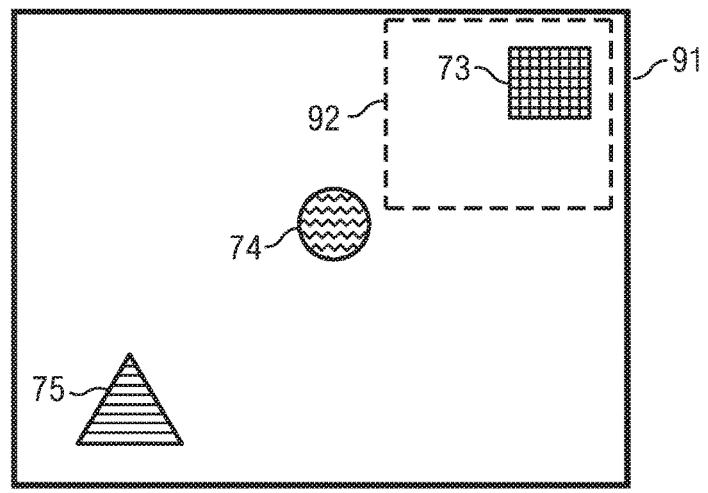

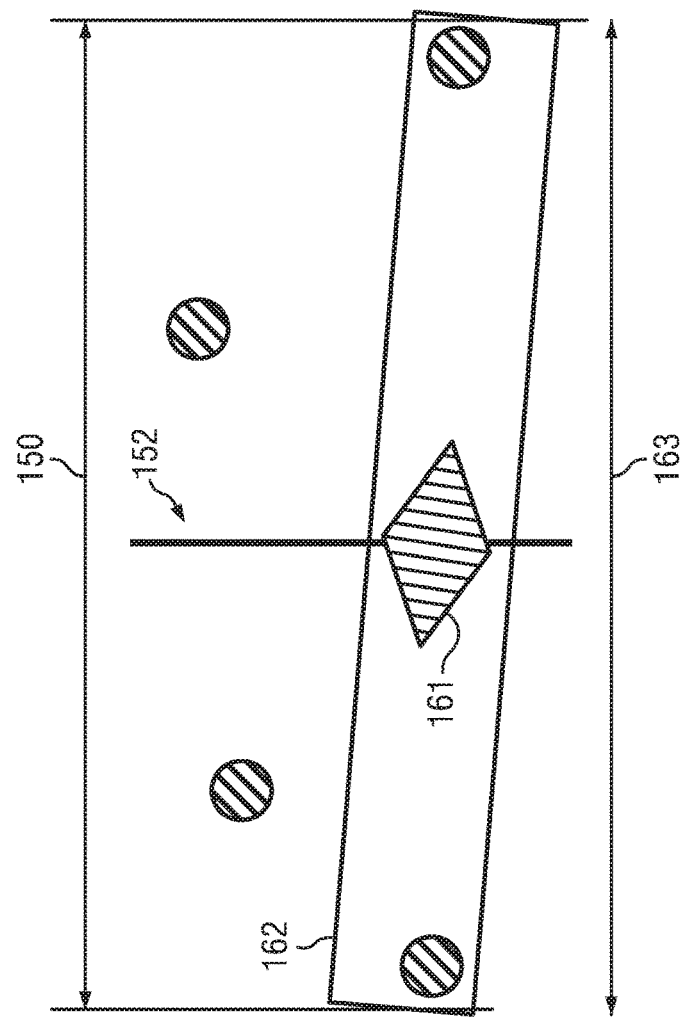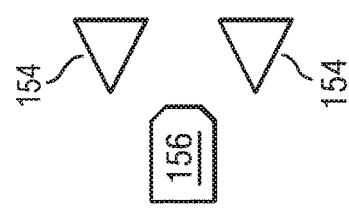
Fig. 13

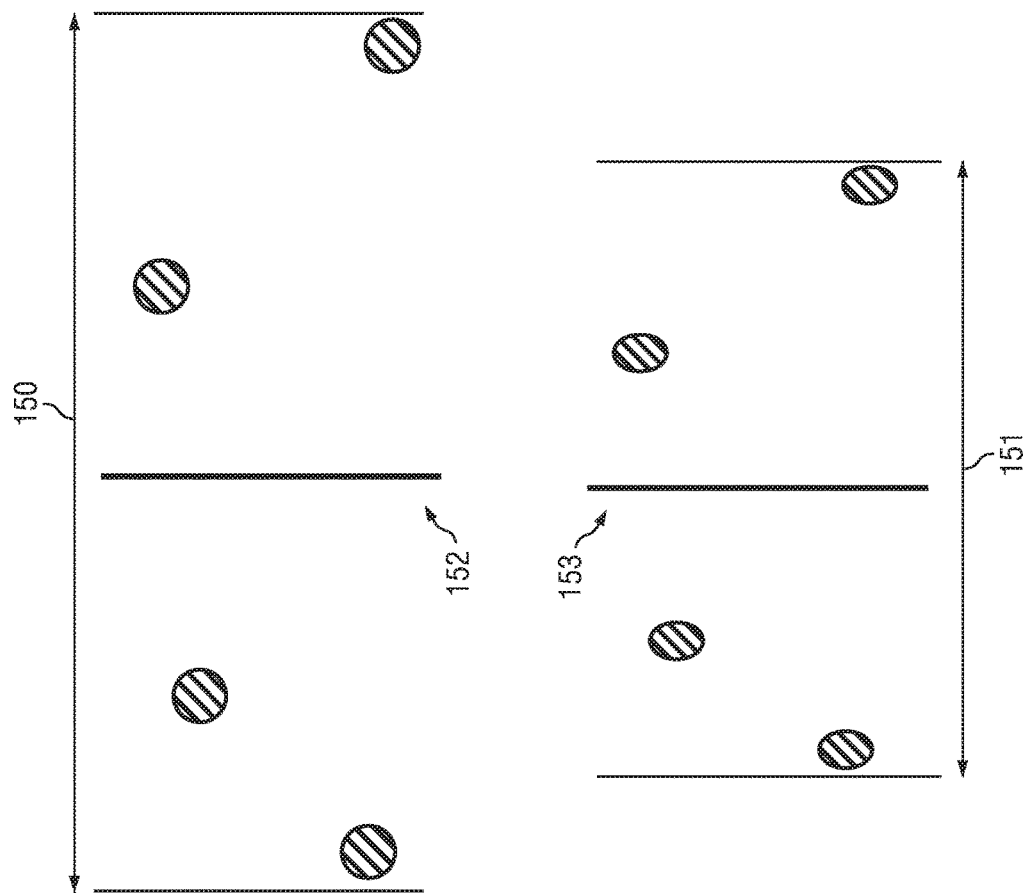
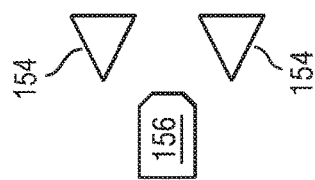
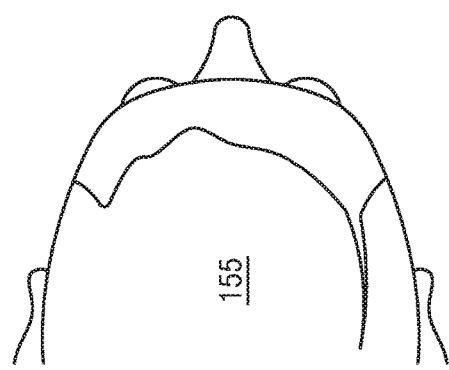
Fig. 15
(Prior Art)

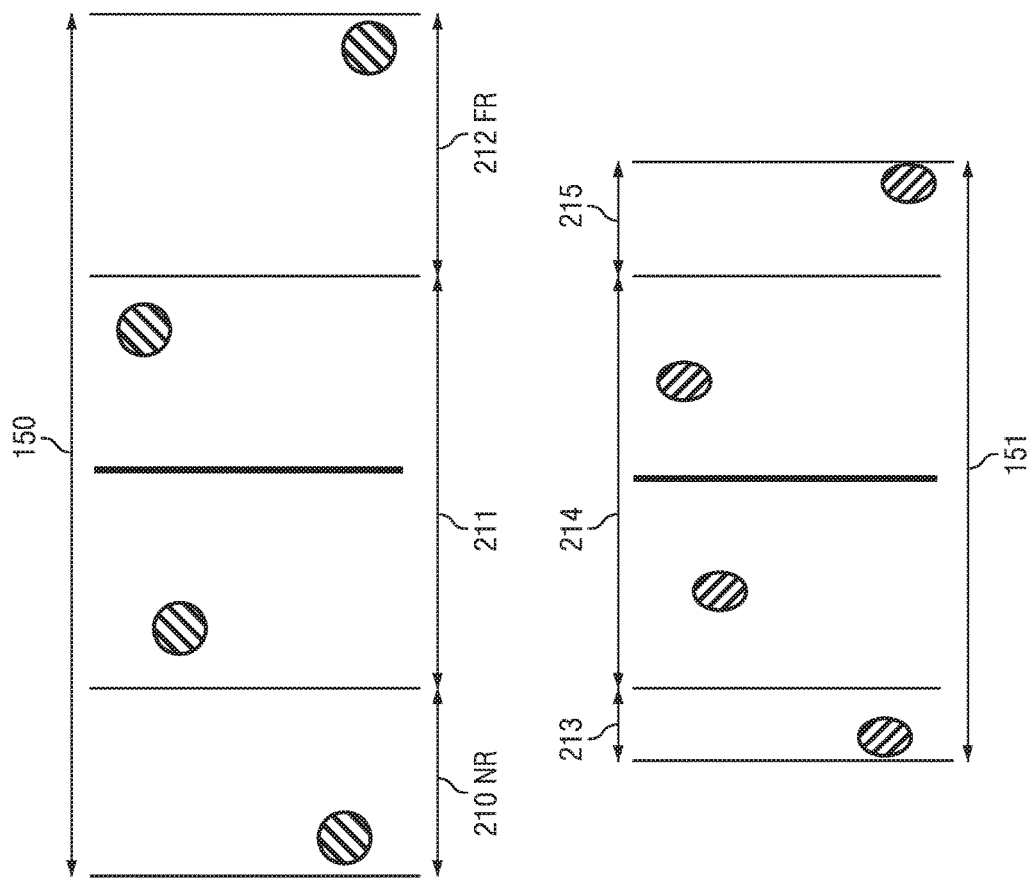
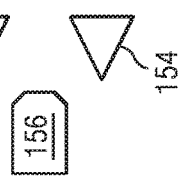
Fig. 21
(Prior Art)
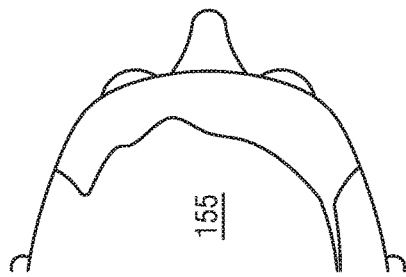

METHOD AND APPARATUS FOR DISPLAYING AND VARYING BINOCULAR IMAGE CONTENT

CROSS-REFERENCE TO RELATED APPLICATIONS

This application claims priority to U.S. Provisional Patent Application Ser. No. 61/766,599, filed Feb. 19, 2013, entitled "Binocular fixation imaging method and apparatus," the entirety of which is herein incorporated by reference.

TECHNICAL FIELD

The present disclosure generally relates to image processing, and more specifically, to depth budget and image processing methods, and technologies.

BACKGROUND

Depth budget has become an important concept in binocular image creation. It may create a limit on the total binocular effect in a three dimensional image. This limit in practice is determined by considering many factors including the limits of the human visual system and the parameters of the image display device being used to present the image to the viewer. For stereoscopic images presented in an image plane the depth budget is often discussed in terms of depth behind and in-front of the image plane.

Techniques are known for controlling the perceived depth in stereoscopic images so that the total binocular effect remains within the depth budget by controlling the capture or synthesis of the image(s). FIG. 15 illustrates a reference U.S. Pat. No. 6,798,406, which generally provides a method for producing a stereoscopic image using at least one real or simulated camera wherein the depth of a scene is mapped to a predetermined depth budget in the perceived stereoscopic image. FIG. 21 illustrates a reference U.S. Patent Pub. No. US 2011/7,983,477, which generally discusses variable depth mapping from scene to perceived stereoscopic image. In addition a method such as that disclosed in U.S. Pat. No. 8,300,089 can also be used for variable depth mapping in the depth (Z) dimension.

The eye's binocular fixation may be determined using a range of eye tracking devices, either by tracking both eyes or by tracking a single eye and inferring the other from this information. One example of a binocular fixation tracking system is the Eyelink 1000, by Research Ltd., Mississauga, Ontario, Canada, which tracks both eyes at high speed.

BRIEF SUMMARY

An aspect of the present disclosure provides a controller that implements variation of the content of binocular images depending upon which region of a binocular image a viewer is fixating. An aspect of the present disclosure includes locally controlling the viewer's perceived depth impression depending on where in perceived depth in an image the viewer is fixating. This has the benefits of enabling the perceived depth to be optimized across the image for quality and performance reasons.

According to an aspect of the disclosure, a binocular imaging system may include a display for presenting a left eye image and a right eye image perceptually simultaneously, in which the left eye image has an associated left eye field of view of the display and the right eye image has an associated right eye field of view of the display. A gaze tracking element may also be included that may identify at least one or both gaze directions of the left eye and the right eye. The binocular imaging system may further include an image controller that may calculate a binocular region of fixation for the left and right eye, and that alters the displayed left and right eye images. The image controller may alter a subsequently displayed binocular image in response to a change in the region of binocular fixation between a currently displayed binocular image and the subsequently displayed binocular image. Altering the displayed left and right eye images may affect the local image depth content in the binocular region of fixation and surrounding the binocular region of fixation. The binocular region of fixation may include a three dimensional region in which the location varies with the gaze direction of one or both of the left and right eyes.

According to another aspect of the disclosure, a method for varying binocular image content may include displaying a current binocular image, and using input from the current binocular image, information from a gaze tracker and scene depth measurement information to calculate a region of binocular interest (RBI) in a scene. The method may also include determining whether the region of binocular interest has changed and calculating the scene depth range for mapping to the depth budget when the region of binocular interest has changed. The method may include using a camera control algorithm to generate a subsequently displayed binocular image using the scene depth range and making the currently displayed image, the subsequently displayed binocular image.

The method for varying binocular image content may further include receiving a second input from the gaze tracker and scene depth measure and using the second input from the current binocular image, the gaze tracker and the scene depth measure to calculate the region of binocular interest in the scene when the region of binocular interest has not substantially changed. The method may also include determining a region of binocular fixation in display space ($RBF_d$) by using gaze tracking information from a viewer watching a displayed binocular image and calculating the equivalent region of binocular fixation in a scene space ($RBF_s$) by using the region of binocular fixation in display space ($RBF_d$) provided an image controller. In determining whether the region of binocular interest has changed, the method may include using the region of binocular fixation in display space ($RBF_d$) and the equivalent region of binocular fixation in the scene space ($RBF_s$). The method may further include changing the region of binocular interest based on scene changes while the region of binocular fixation in display space does not substantially change.

According to another aspect of the disclosure, a method for varying binocular image content may include displaying a current binocular image, using input from the current binocular image and a gaze tracker to calculate a subsequent region of binocular fixation, and determining any change in binocular fixation between a current region binocular fixation and the subsequent region of binocular fixation. If the case of a change in binocular fixation between a current region binocular fixation and the subsequent region of binocular fixation, the method may include calculating a disparity range of the subsequent range of binocular fixation. The method may also include determining whether the disparity range is substantially zero and creating a subsequently displayed image when the disparity range is not substantially zero. The method may also include making the currently displayed image, the subsequently displayed binocular image.

Continuing the discussion, the method may include receiving a second input from the gaze tracker and using the second input from the current binocular image and the gaze tracker to calculate a subsequent region of binocular fixation when the subsequent region of binocular fixation has not substantially changed. The method may include receiving a third input from the gaze tracker and using the third input from the current binocular image and the gaze tracker to calculate a subsequent region of binocular fixation when the disparity range is approximately zero. The gaze tracker may determine the disparity within the fixated region, in which the gaze tracker determines the plane of fixation from the difference between left eye and right eye screen fixation points.

In the case the method determines whether the disparity range is substantially zero, the method may include comparing the image disparity of the subsequent object with zero, in which the subsequent object is being imaged where it is the closest object to a viewer in the region of binocular fixation. The method may also include altering a subsequently displayed image in response to a change in the region of binocular fixation between the currently displayed binocular image and the subsequently displayed binocular image and also may form a currently displayed binocular image. Forming a currently displayed binocular image may include estimating a 3D region of fixation and projecting the 3D region of fixation into an image plane to form a binocular region of fixation. The currently displayed binocular image is formed as a left image and a right image and may be selected from a larger source image.

BRIEF DESCRIPTION OF THE DRAWINGS

Embodiments are illustrated by way of example in the accompanying figures, in which like reference numbers indicate similar parts, and in which:

FIG. 2 is a schematic diagram illustrating one embodiment of images for the left and right eye, in accordance with the present disclosure;

FIG. 4 is a schematic diagram illustrating one embodiment of the viewer's region of binocular fixation, in accordance with the present disclosure;

FIG. 7 is a schematic diagram illustrating one embodiment of a binocular image pair, in accordance with the present disclosure;

FIG. 9 is a schematic diagram illustrating one embodiment of a displayed image, in accordance with the present disclosure;

FIG. 13 is a schematic diagram illustrating one embodiment of a scene space, in accordance with the present disclosure;

FIG. 15 is a schematic diagram illustrating one embodiment of a binocular image, in accordance with the present disclosure;

FIG. 21 is a schematic diagram illustrating one embodiment of scene depth range and perceived depth range, in accordance with the present disclosure;

DETAILED DESCRIPTION

Figure 1:
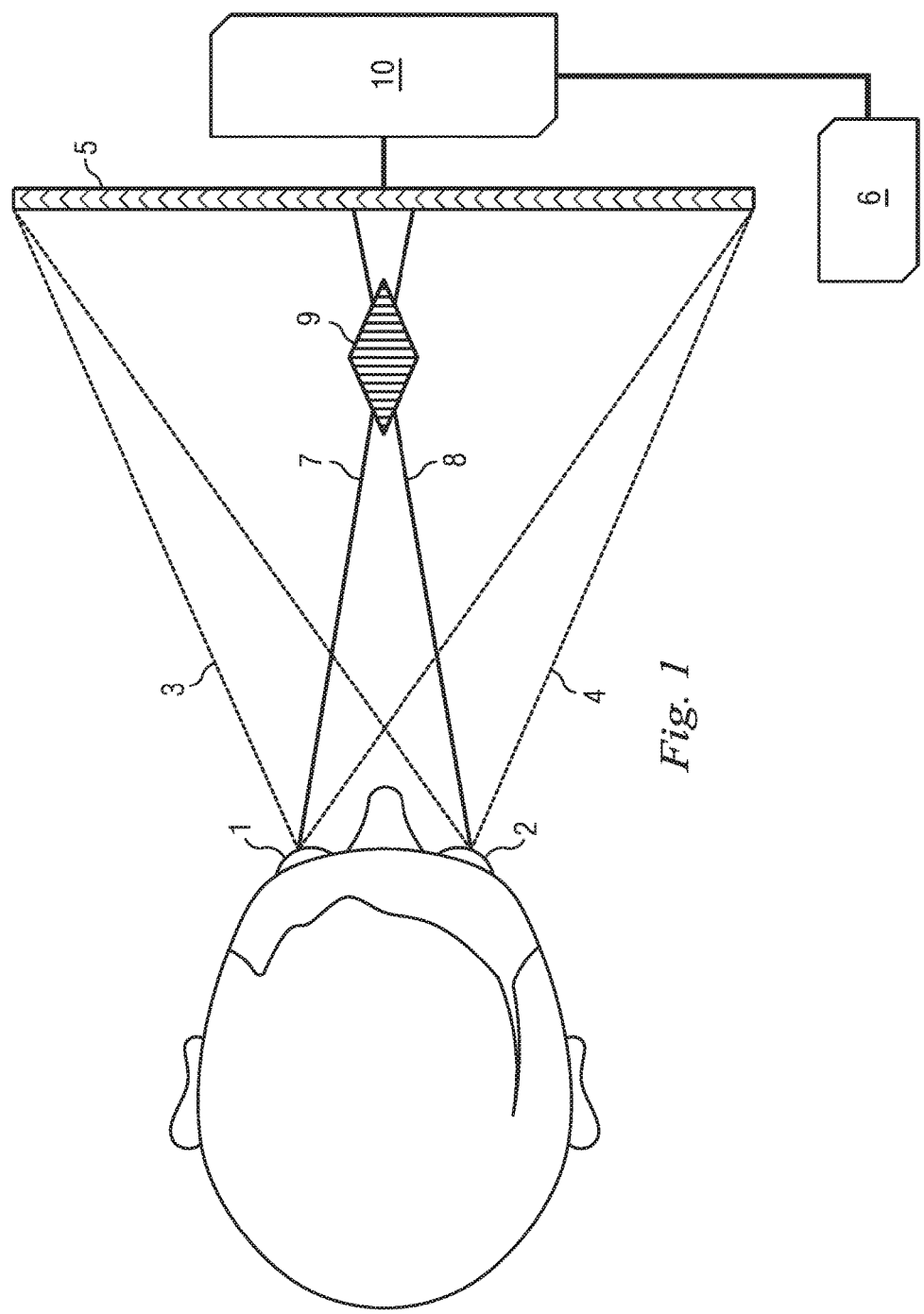
FIG. 1 is a schematic diagram illustrating one embodiment of is a binocular imaging apparatus, in accordance with the present disclosure.

Generally, according to one aspect of the disclosure, a binocular imaging system may include a display for presenting a left eye image and a right eye image perceptually simultaneously, in which the left eye image has an associated left eye field of view of the display and the right eye image has an associated right eye field of view of the display. A gaze tracking element may also be included that may identify at least one or both gaze directions of the left eye and the right eye. The binocular imaging system may further include an image controller that may calculate a binocular region of fixation for the left and right eye, and that alters the displayed left and right eye images. The image controller may alter a subsequently displayed binocular image in response to a change in the region of binocular fixation between a currently displayed binocular image and the subsequently displayed binocular image. Altering the displayed left and right eye images may affect the local image depth content in the binocular region of fixation and surrounding the binocular region of fixation. The binocular region of fixation may include a three dimensional region in which the location varies with the gaze direction of one or both of the left and right eyes.

According to another aspect of the disclosure, a method for varying binocular image content may include displaying a current binocular image, and using input from the current binocular image, information from a gaze tracker and scene depth measurement information to calculate a region of binocular interest (RBI) in a scene. The method may also include determining whether the region of binocular interest has changed and calculating the scene depth range for mapping to the depth budget when the region of binocular interest has changed. The method may include using a camera control algorithm to generate a subsequently displayed binocular image using the scene depth range and making the currently displayed image, the subsequently displayed binocular image.

The method for varying binocular image content may further include receiving a second input from the gaze tracker and scene depth measure and using the second input from the current binocular image, the gaze tracker and the scene depth measure to calculate the region of binocular interest in the scene when the region of binocular interest has not substantially changed. The method may also include determining a region of binocular fixation in display space ($RBF_d$) by using gaze tracking information from a viewer watching a displayed binocular image and calculating the equivalent region of binocular fixation in a scene space ($RBF_s$) by using the region of binocular fixation in display space ($RBF_d$) provided an image controller. In determining whether the region of binocular interest has changed, the method may include using the region of binocular fixation in display space ($RBF_d$) and the equivalent region of binocular fixation in the scene space ($RBF_s$). The method may further include changing the region of binocular interest based on scene changes while the region of binocular fixation in display space does not substantially change.

According to another aspect of the disclosure, a method for varying binocular image content may include displaying a current binocular image, using input from the current binocular image and a gaze tracker to calculate a subsequent region of binocular fixation, and determining any change in binocular fixation between a current region binocular fixation and the subsequent region of binocular fixation. If the case of a change in binocular fixation between a current region binocular fixation and the subsequent region of binocular fixation, the method may include calculating a disparity range of the subsequent range of binocular fixation. The method may also include determining whether the disparity range is substantially zero and creating a subsequently displayed image when the disparity range is not substantially zero. The method may also include making the currently displayed image, the subsequently displayed binocular image.

Continuing the discussion, the method may include receiving a second input from the gaze tracker and using the second input from the current binocular image and the gaze tracker to calculate a subsequent region of binocular fixation when the subsequent region of binocular fixation has not substantially changed. The method may include receiving a third input from the gaze tracker and using the third input from the current binocular image and the gaze tracker to calculate a subsequent region of binocular fixation when the disparity range is approximately zero. The gaze tracker may determine the disparity within the fixated region, in which the gaze tracker determines the plane of fixation from the difference between left eye and right eye screen fixation points.

In the case the method determines whether the disparity range is substantially zero, the method may include comparing the image disparity of the subsequent object with zero, in which the subsequent object is being imaged where it is the closest object to a viewer in the region of binocular fixation. The method may also include altering a subsequently displayed image in response to a change in the region of binocular fixation between the currently displayed binocular image and the subsequently displayed binocular image and also may form a currently displayed binocular image. Forming a currently displayed binocular image may include estimating a 3D region of fixation and projecting the 3D region of fixation into an image plane to form a binocular region of fixation. The currently displayed binocular image is formed as a left image and a right image and may be selected from a larger source image. There are systems disclosed, as generally discussed in U.S. Pat. No. 4,634,384 and U.S. Patent Publication No. 2003/0067476, both of which are herein incorporated by reference in their entirety, which differentially vary two-dimensional image properties based on knowledge of a foveated region. These systems do not address binocular conditions.

There are systems disclosed, as generally discussed in U.S. Patent Publication No. 2012/0200676 that use eye tracking to adjust a computer graphics model in a scene so that a stereoscopic image rendered from the model is altered. These systems adjust the entire model and do not result in differential changes across the stereoscopic image in order to vary depth mapping from scene to image inside and outside the region of binocular interest.

Additionally, there are systems disclosed, as generally discussed in U.S. Pat. No. 6,198,484, which are herein incorporated by reference in their entirety, that alter the stereoscopic image presentation based on head position and/or eye tracking to account for motion parallax. These systems do not make differential changes across the stereoscopic image in order to vary depth mapping from scene to image inside and outside the region of binocular interest.

FIG. 1 illustrates a binocular imaging system which may include a binocular image display 5 for presenting different images perceptually and substantially simultaneously to the left and right eyes. The viewer who sees the binocular images presented by image display 5 in which left eye images are seen by the left eye 1 with a field of view of the display 3, and right eye images are seen by the right eye 2 with a field of view of the display 4. The binocular imaging system may also include a gaze tracking element 6 that may identify one or both gaze directions of the left eye and right eye 7, 8, respectively, and may include a way to calculate the viewer's binocular region of fixation 9. The gaze tracking element 6 may calculate the viewer's binocular region of fixation 9 by way of any appropriate processing or computing system that may include a computer readable medium. The binocular region of fixation 9 may be a three dimensional region in which the location varies with the direction of gaze. The binocular imaging system may also include a way to alter the displayed images in such a way as to affect the local image depth content both in and surrounding the binocular region of fixation.

In one embodiment a method may discuss a fixated region which has substantially zero disparity. This embodiment may provide a method in the image controller 10 that may alter the subsequently displayed images in response to the change of the viewer's region of binocular fixation 9 between the currently displayed binocular image and the subsequently displayed binocular image, as generally illustrated in FIGS. 6, 2, and 1.

Figure 6:
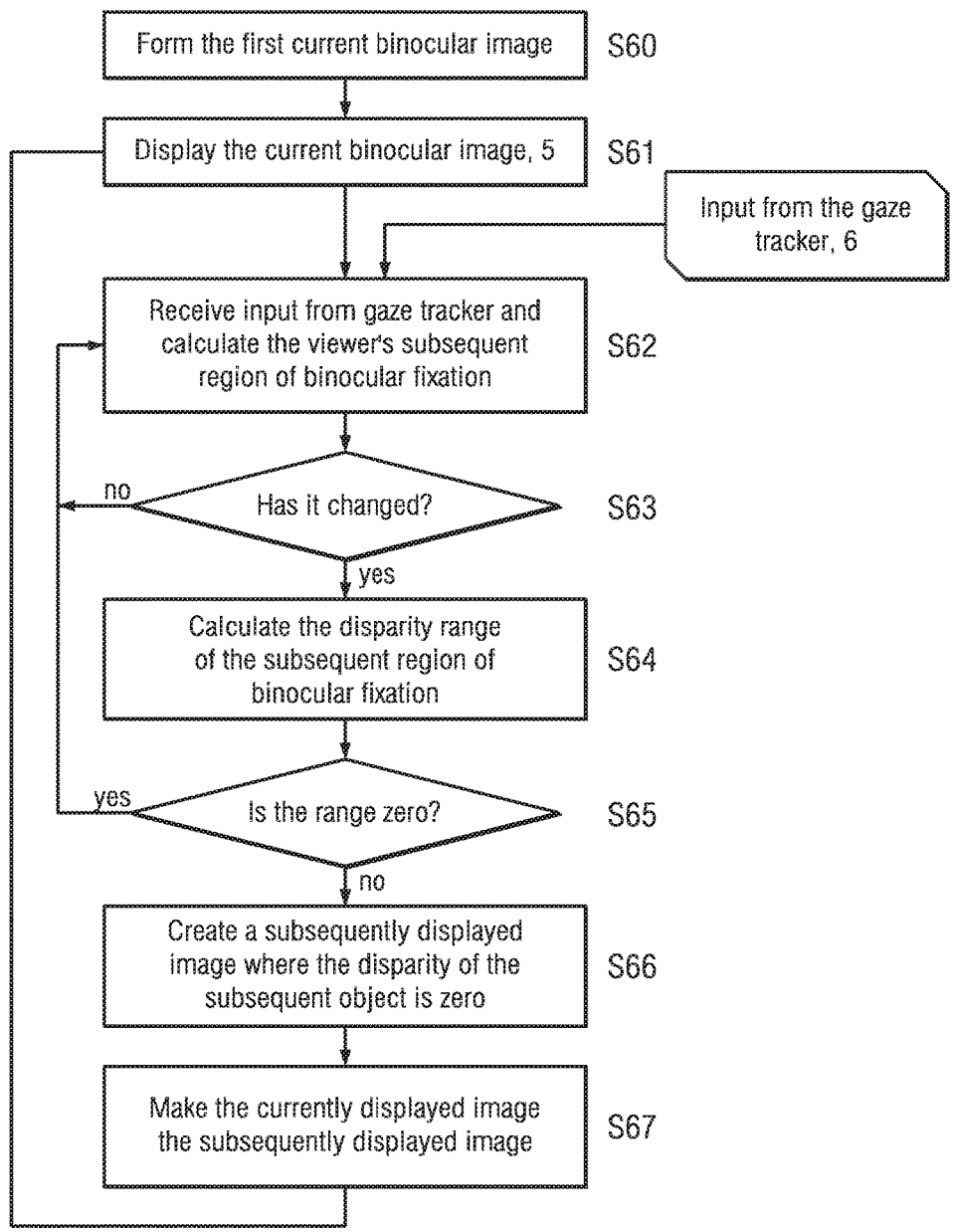
FIG. 6 is a schematic diagram illustrating a flow chart, in accordance with the present disclosure.

In FIG. 6, step S60 forms the currently displayed images as a left image 22 and right image 23. The currently displayed images may be selected from larger source images 20 and 21, as shown in FIG. 2. In step S61 of FIG. 6, the current binocular images are displayed by the image display 5 of FIG. 1.

The left and right images 22 and 23 of FIG. 2 may contain images of objects for example 24, 25, 26 whose horizontal location may differ. This horizontal difference between images of the same object in different locations in left and right eye views is known as image disparity and its magnitude and sign controls the depth perceived by the viewer when they binocularly fuse the left and right image.

Also in FIG. 6, as shown in step S62, the image controller 10 of FIG. 1, receives input from the gaze tracker 6 and uses this input to calculate the subsequent binocular region of fixation.

Continuing the discussion with respect to FIGS. 1, 2, and 6, in step S63 the controller determines any change in binocular fixation between the current and subsequent fixations, if there is no change in the binocular fixation between the current and subsequent fixations, the controller continues at step S62.

In step S64, when there is a change in binocular fixation, the image controller 10 calculates which subsequent object in the scene is being imaged where it is the closest object to the viewer in the region of binocular fixation. In step S65 the controller compares the image disparity of the subsequent object with zero, if the disparity is zero, the controller continues at step S62.

In step S66 the controller uses the image disparity of the subsequent object to adjust the subsequently displayed images so that the image disparity of the subsequent object becomes substantially zero. One method is illustrated in FIGS. 3, 4 and 5.

Figure 3:
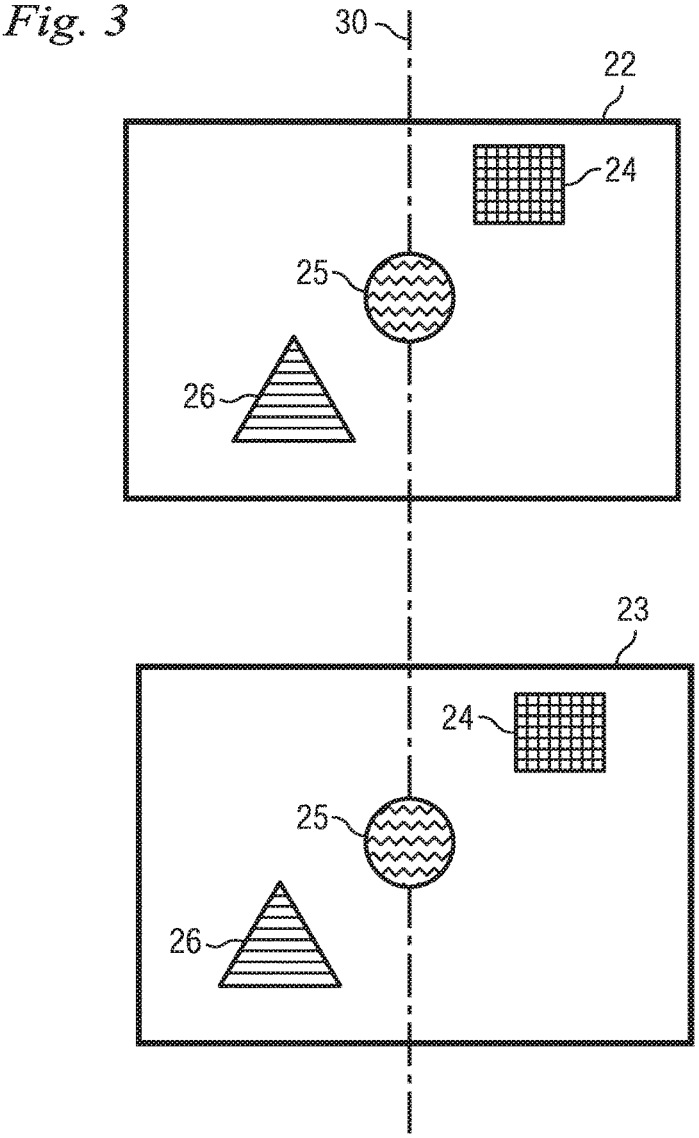
FIG. 3 is a schematic diagram illustrating one embodiment of a currently displayed binocular image pair in accordance with the present disclosure.

FIG. 3 illustrates the currently displayed binocular image pair 22, 23 where the region of binocular fixation is aligned with the object 25 in the image. FIG. 3 also includes an illustrative line showing an object with zero disparity in the displayed image. The horizontal disparity between the left and right images for object 25 is zero, as is indicated by the illustrative line 30.

In FIG. 4, the viewer's region of binocular fixation has moved from object 25 to object 24 and the image controller 10 reacts by creating the subsequently displayed images 40 and 41. Region 40 illustrates a newly selected region to be displayed in the left eye view and region 41 illustrates a newly selected region to be displayed in the right eye view. The image controller achieves this by finding the disparity for object 24 and, in this case, then slides the right image window to the right by that number of pixels so the disparity of subsequently fixated object 24 is zero.

Figure 5:
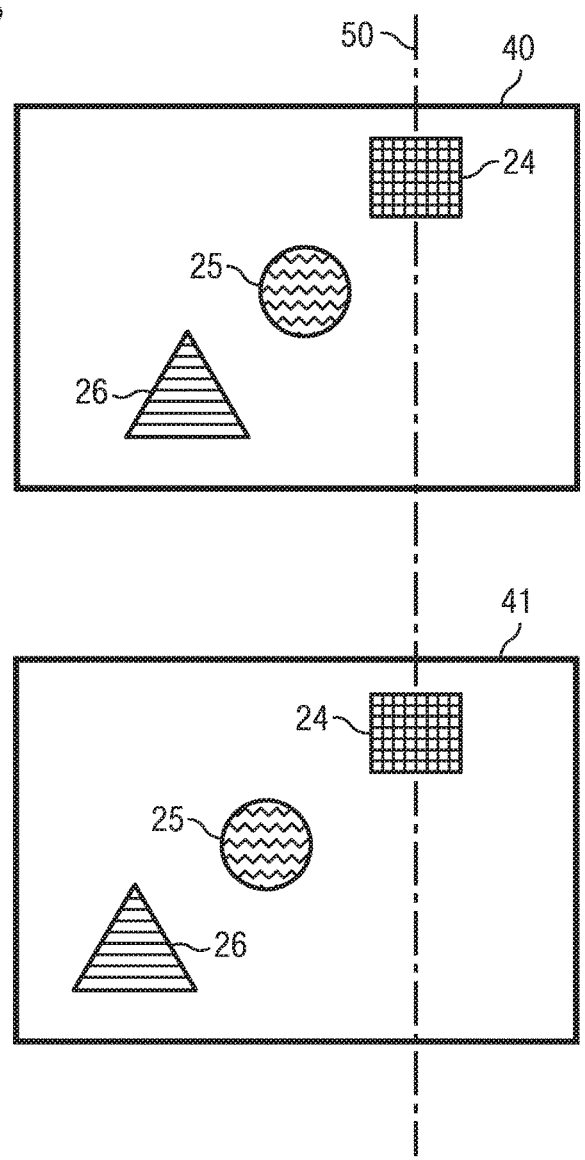
FIG. 5 is a schematic diagram illustrating one embodiment of an a displayed image with little to no disparity, in accordance with the present disclosure.

The resulting subsequently displayed images are shown in FIG. 5 where the horizontal disparity for object 24 is now zero as shown by the illustrative line 50. FIG. 5 includes an illustrative line to show the new object with zero disparity in the displayed image.

In step S66 of FIG. 6, the subsequently displayed images 40 and 41 are now made the currently displayed images and control returns to step S61 where the currently displayed images are displayed by the image display 5.

Another related embodiment may include a fixated region which may have substantially zero disparity. This embodiment adjusts the imagery in a similar manner to that of the previous embodiment but uses the gaze tracker to determine the disparity within the fixated region. When the left and right eye images are displayed on a stereoscopic device, the gaze detector can determine the plane of fixation from the difference between left and right eye screen fixation points. If the plane of fixation is in front of the display screen, for example when the left eye's fixation point on the display is to the right of the right eye's fixation point, it can be inferred with little to no calculation that the imagery in the fixated region has negative disparity. Shifting the imagery relative to each other can remove this negative disparity and provide for substantially zero disparity as in the previous embodiment.

Yet another embodiment may have a fixated region with disparity and the surrounding region may have substantially no disparity. This embodiment may provide a method in the image controller 10 that may alter the subsequently displayed images in response to the change in the viewer's region of binocular fixation 9 between the currently displayed binocular image and the subsequently displayed binocular image. Discussion is provided in FIGS. 11, 7, 8, 9, and 10.

Figure 8:
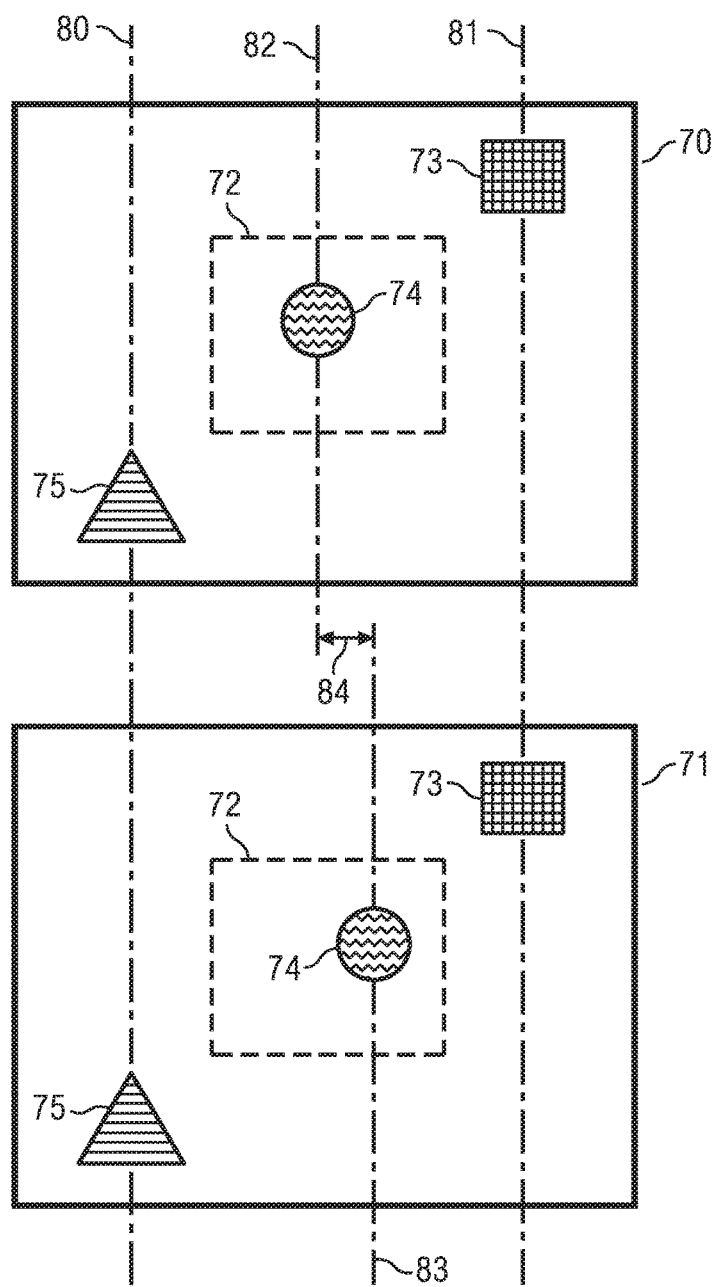
FIG. 8 is a schematic diagram illustrating one embodiment of a displayed image, in accordance with the present disclosure.
Figure 10:
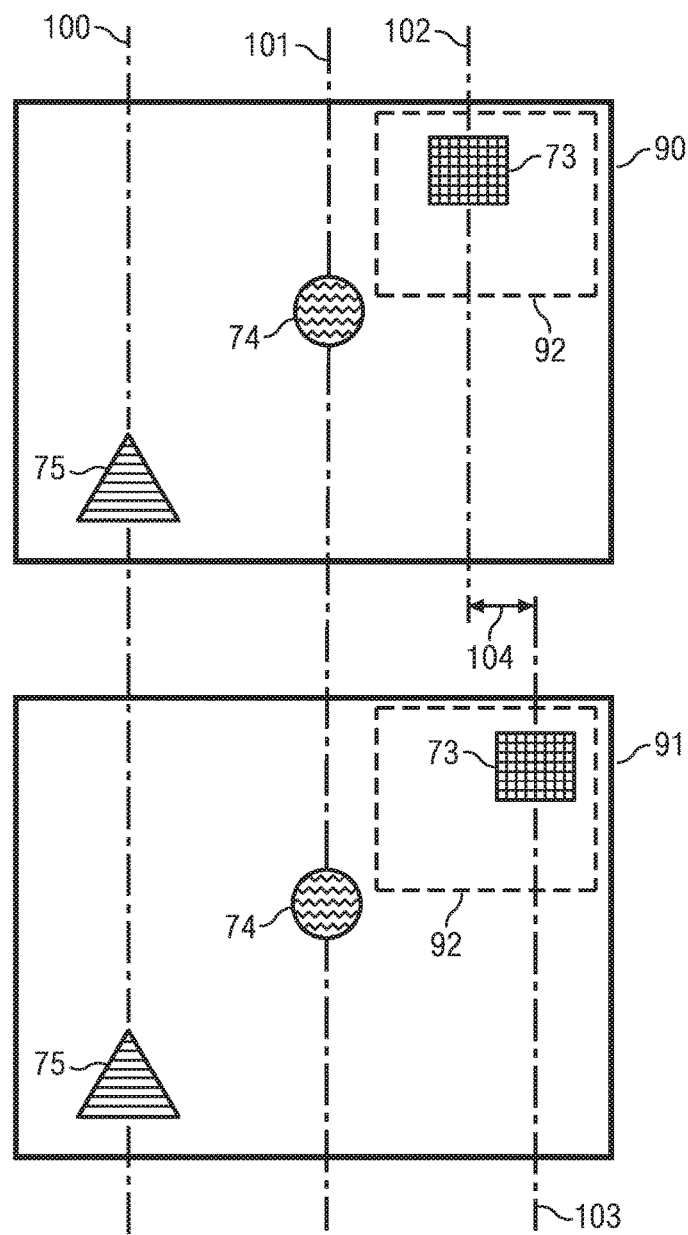
FIG. 10 is a schematic diagram illustrating one embodiment of a displayed image, in accordance with the present disclosure.
Figure 11:
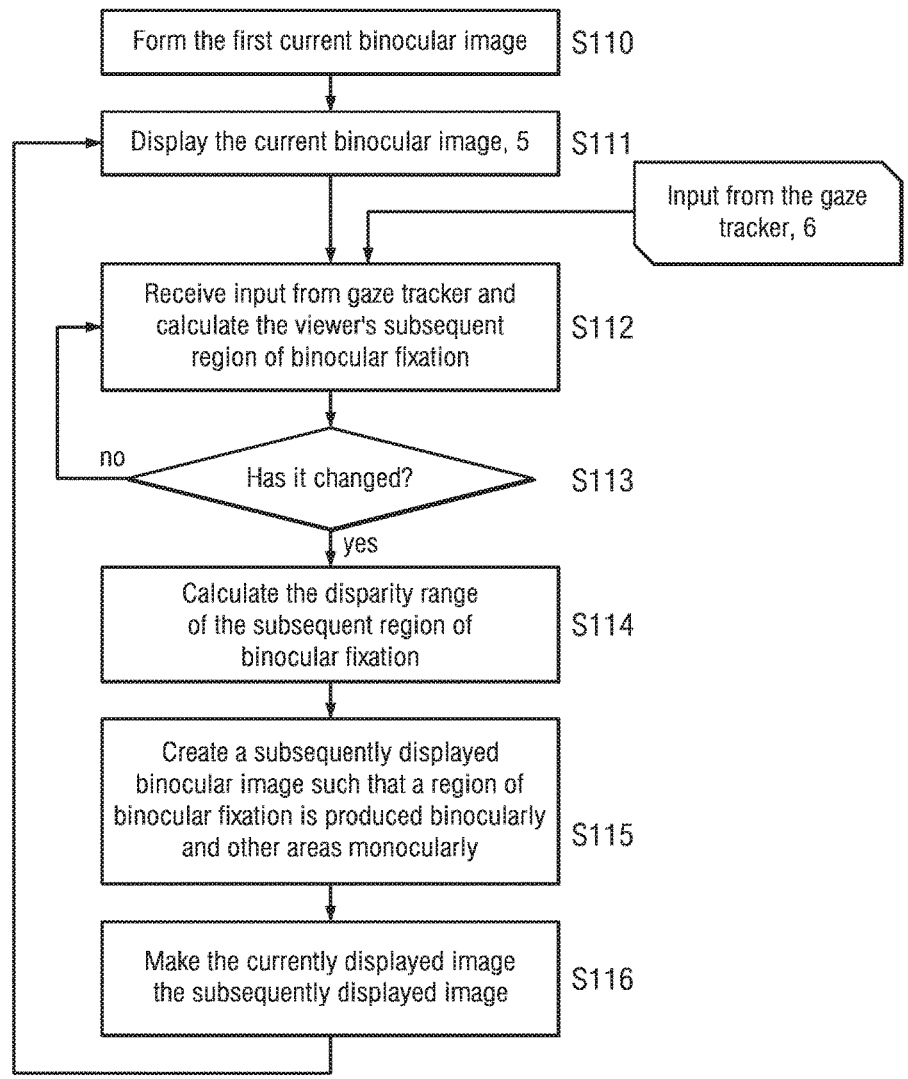
FIG. 11 is a schematic diagram illustrating a flow chart, in accordance with the present disclosure.

In FIG. 11, step S110 forms the currently displayed images as in FIG. 7 for left eye 70 and right eye 71, respectively. To form the currently displayed images, a 3D region of fixation is measured or estimated and is projected into the image plane 72 to form the binocular region of fixation. Any image information outside this region 72 in the images 70 and 71 is the same in each image. This may be a monocular image providing the same information to both the viewers' eyes. Any image information inside region 72 is binocular. This image information may be rendered or captured or synthesized with binocular disparity information. The result is illustrated in FIG. 8. The objects 75 and 73 included in the scene, may be outside region 72 and may have no binocular disparity shown by illustrative lines 80 and 81 in FIG. 8. Meanwhile, the object 74 inside region 72 has binocular disparity 84 and is shown by illustrative lines 82 and 83.

In step S111 of FIG. 11, the current binocular image pair 70 and 71 is displayed on the image display 5 of FIG. 1. In step S112 the image controller 10 of FIG. 1 receives input from the gaze tracker and calculates the subsequent region of binocular fixation 92 in FIG. 9. In step 113 if the region of binocular fixation has not changed, then control returns to step S112 of FIG. 11.

In step S114 of FIG. 11, the region of binocular fixation has changed and the image controller calculates the depth range of the subsequent region of binocular fixation in the scene. Continuing the discussion, in step S115 the depth range information may be used to create a formed binocular image for the region of binocular fixation 92 which may be combined with a monocular image to form the subsequently displayed images 90 and 91 as shown in FIG. 9. The result is highlighted in FIG. 10, in which the region with binocular disparity 92 includes object 73 which has binocular disparity 104. Additionally, objects 74 and 75 outside the region of binocular fixation no longer have any disparity as illustrated by lines 100 and 101.

Finally, in step S116 the currently displayed binocular image becomes the subsequently displayed binocular image and control returns to step S111.

Figure 12:
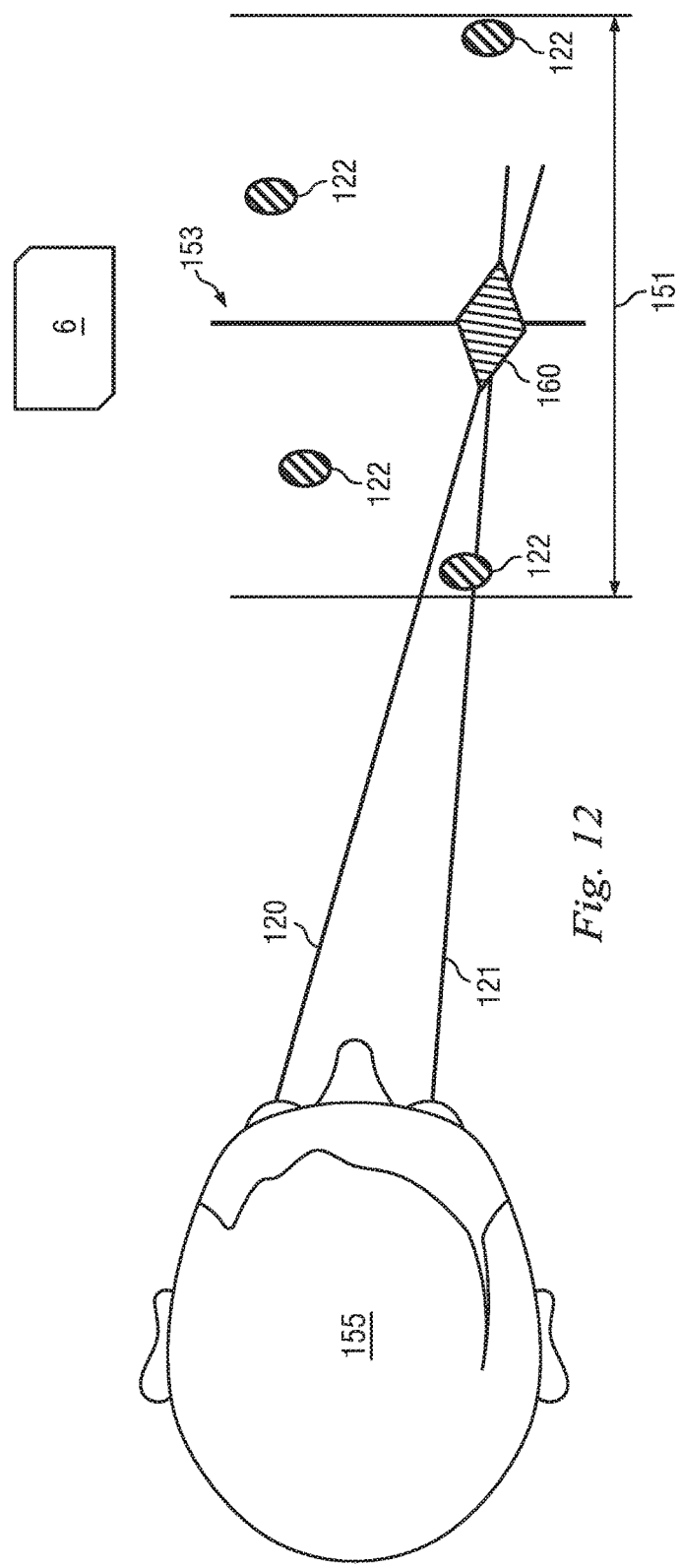
FIG. 12 is a schematic diagram illustrating one embodiment of a gaze tracking system, in accordance with the present disclosure.

FIG. 12 is a schematic diagram illustrating one embodiment of a gaze tracking system. FIG. 12 provides an example of a viewer and a display 153 and the different elements in display space. In FIG. 12, a viewer's eyes 155 are looking at a displayed binocular image. The left eye of the viewer may be looking in a direction referred to as a left eye gaze direction 120 and the right eye of the view may be looking in a direction referred to as a right eye gaze direction 121. The viewer's eyes 155 may be tracked by a gaze tracking system 6. As illustrated in FIG. 12, scene 122 depicts a scene as perceived in a fused binocular image and region 160 $RBF_d$ may be a region of binocular fixation in display space. The gaze tracking system 6 may provide gaze tracking information which may be used to calculate a viewer's subsequent region of binocular fixation, among other things.

FIG. 13 is a schematic diagram illustrating one embodiment of a scene space. FIG. 13 provides an example of cameras and a scene space. In FIG. 13, cameras 154 may be located in a position for capturing images of a scene. Located by the cameras 154 may be a depth measurement system 156. Although the depth measurement system 156 is illustrated as centrally located between the cameras 154, this is for discussion purposes only and not of limitation as the depth measurement system may be located in other positions with respect to the scene space as appropriate. In FIG. 13, the range 150 may be the total scene depth range and the scene depth range 163 may represent the scene depth range to map to a depth budget in display space. Additionally, as depicted in FIG. 13, the region 162 may be the region of binocular interest, RBI, 162 and the region 161 may be the region of binocular fixation projected into scene space, $RBF_s$ 161.

In yet another embodiment, depth mapping from scene to display space and may be determined by the region of binocular fixation in the display space. This embodiment is described referring to FIGS. 20, 15, 16, 17, 18, and 19.

Referring to FIG. 15, the viewer is looking at a first current binocular image and sees perceived depth in it, in this case, within some pre-determined perceived depth budget 151. The specific mapping of depth from the scene space being imaged 150 to the display space perceived depth budget 151 can be calculated using a pre-existing camera control algorithm such as in reference U.S. Pat. No. 6,798,406, given a depth measurement element 156 to determine the range of depth in the scene. The depth range 150 in the scene can, for example, be computed from a depth map in synthetic scenes or an optical or laser range finder in real scenes.

Figure 16:
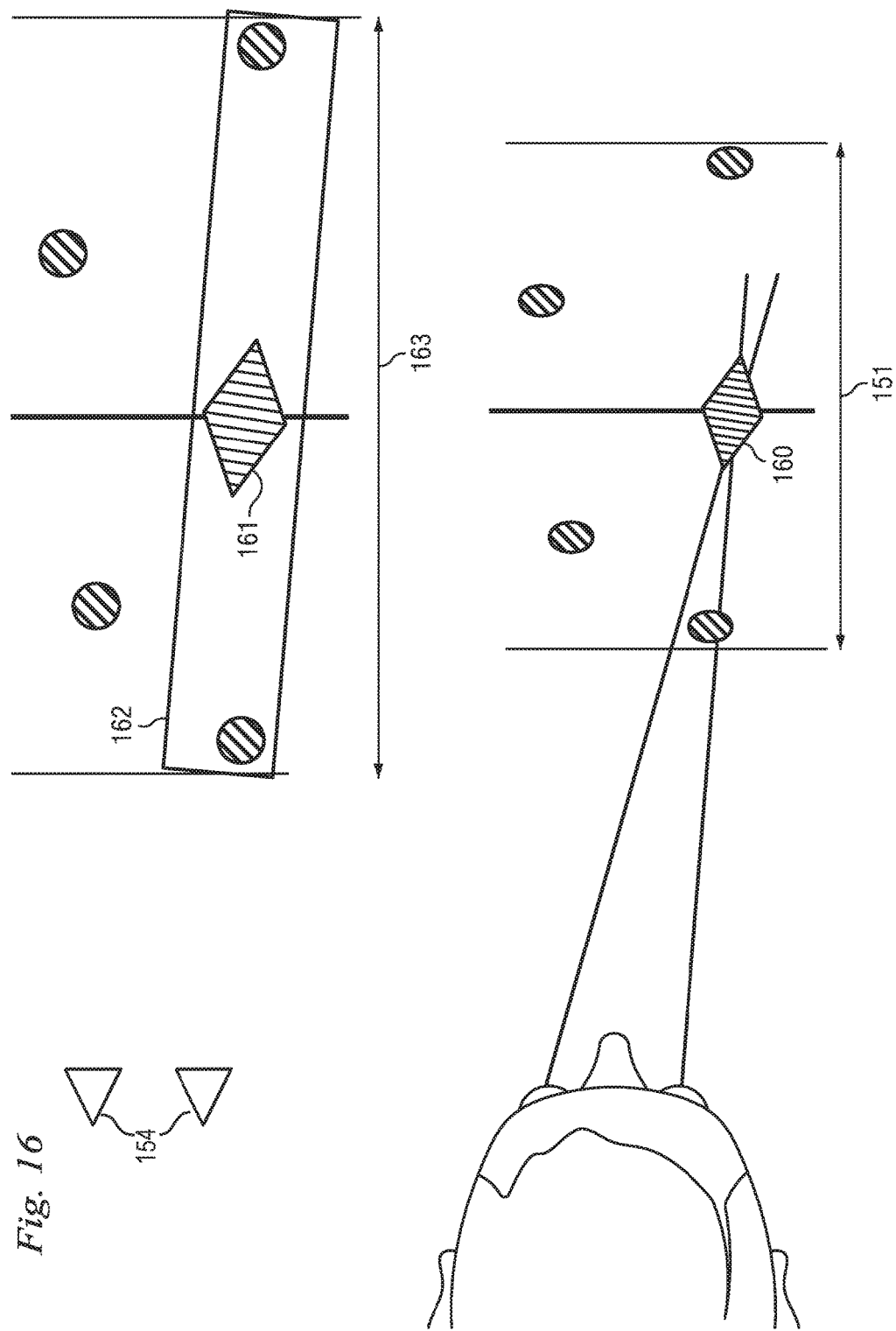
FIG. 16 is a schematic diagram illustrating one embodiment of a scene depth range and depth budgets, in accordance with the present disclosure.
Figure 20:
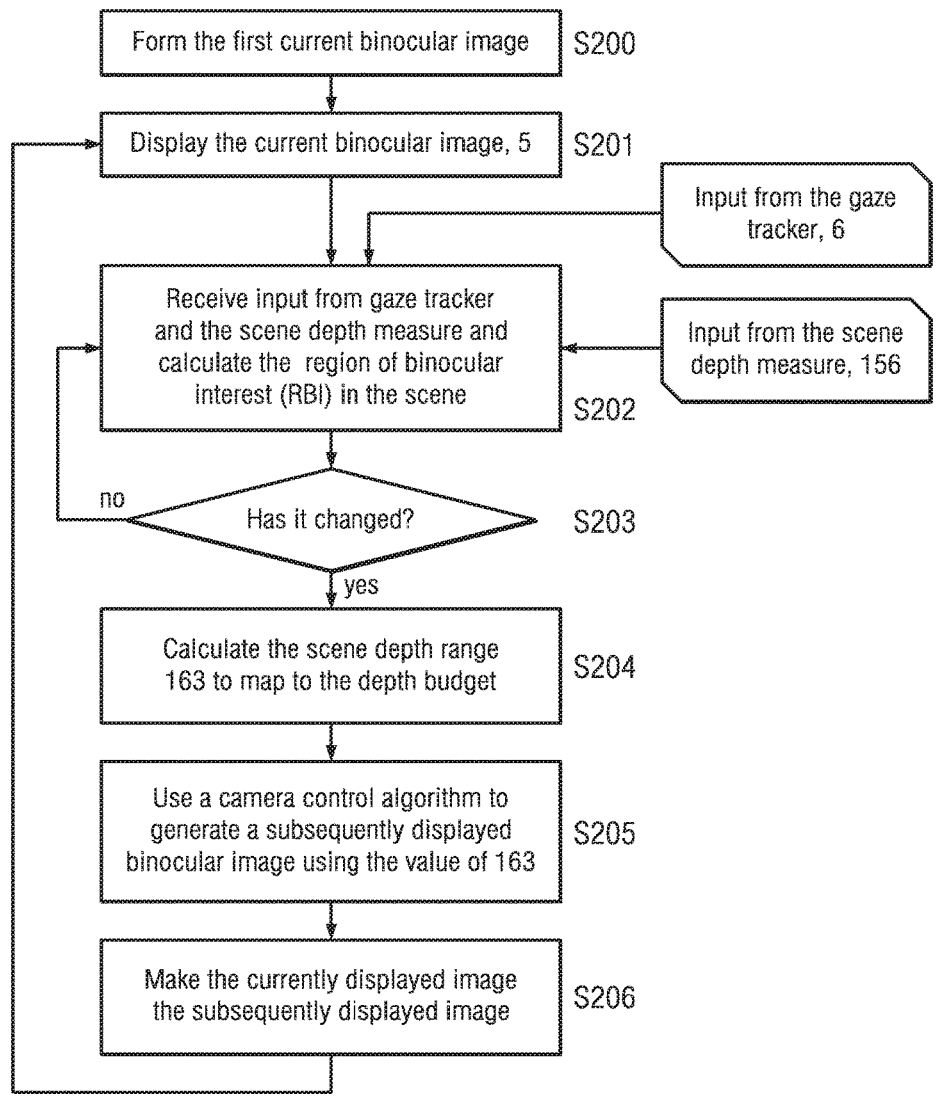
FIG. 20 is a schematic diagram illustrating a flow chart, in accordance with the present disclosure.

Referring to the flowchart in FIG. 20, a first current binocular image is produced in step S200 and then displayed in step S201. Referring to FIG. 16, while the viewer is looking at the displayed binocular image their gaze is being tracked using a gaze tracking element 6 of FIG. 1 and this information is used to determine the region of binocular fixation in display space $RBF_d$ 160.

The $RBF_d$ is used by the image controller 10 of FIG. 1 to calculate the equivalent region of binocular fixation in the scene space $RBF_s$ 161. $RBF_s$ 161 may then be used to calculate the region of binocular interest in scene space RBI 162. RBI encompasses any objects that fall in a volume of space that is a super-set of the $RBF_s$. The RBI may be any convenient three-dimensional shape including, but not limited to, a parallelepiped, cylinder, ellipse, frustum, and so forth.

In step S204 of FIG. 20, once the RBI is calculated, the scene depth range that is to be mapped to the perceived depth budget can be found by calculating the depth extent of the RBI, illustrated in FIG. 16 as 163. This allows the application of any depth mapping camera control algorithm as generally discussed in U.S. Pat. No. 6,798,406 to generate a subsequent binocular image in step S205 and set this for display in step S206.

Figure 17:
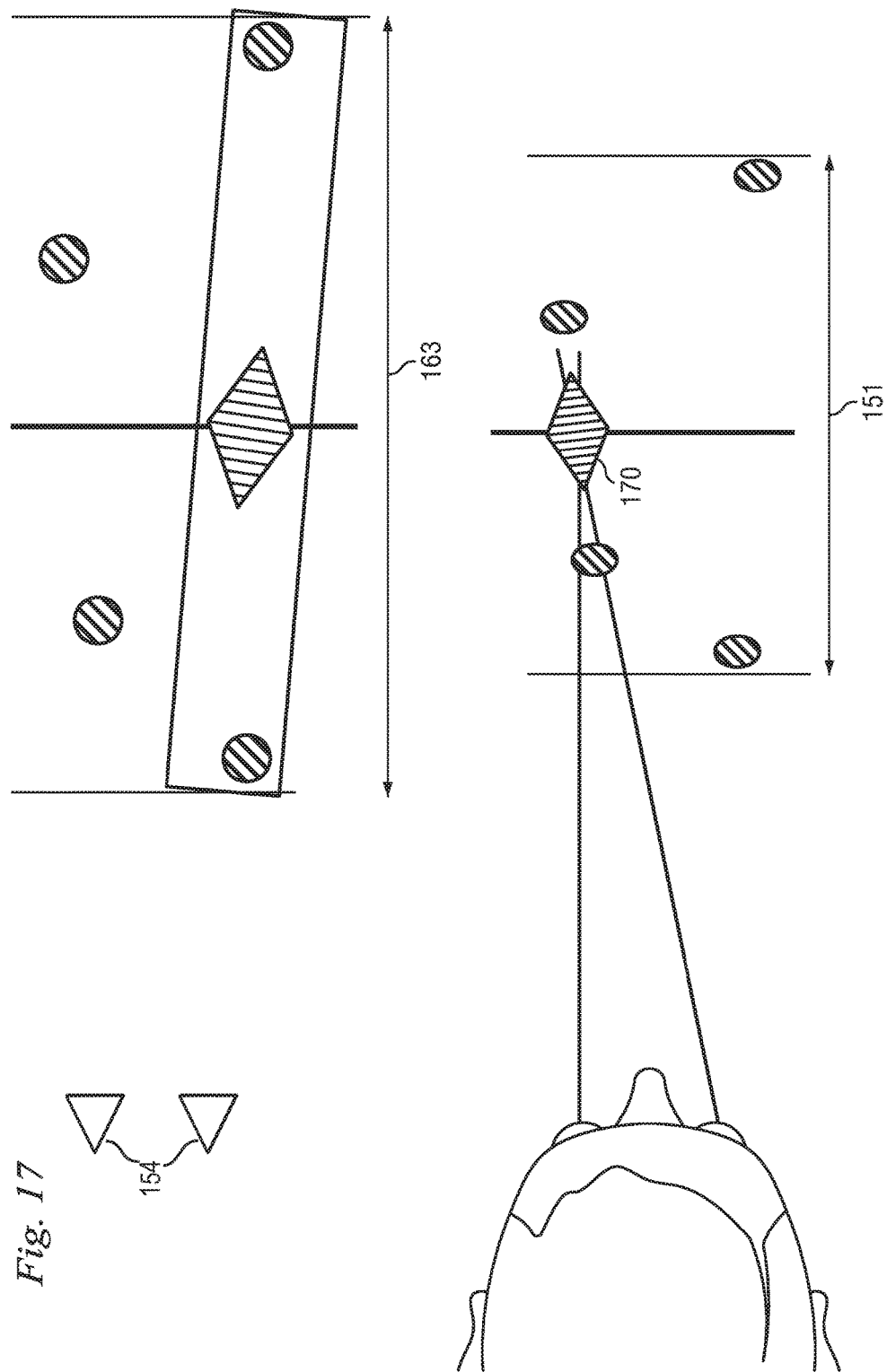
FIG. 17 is a schematic diagram illustrating one embodiment of an image controller's response, in accordance with the present disclosure.
Figure 18:
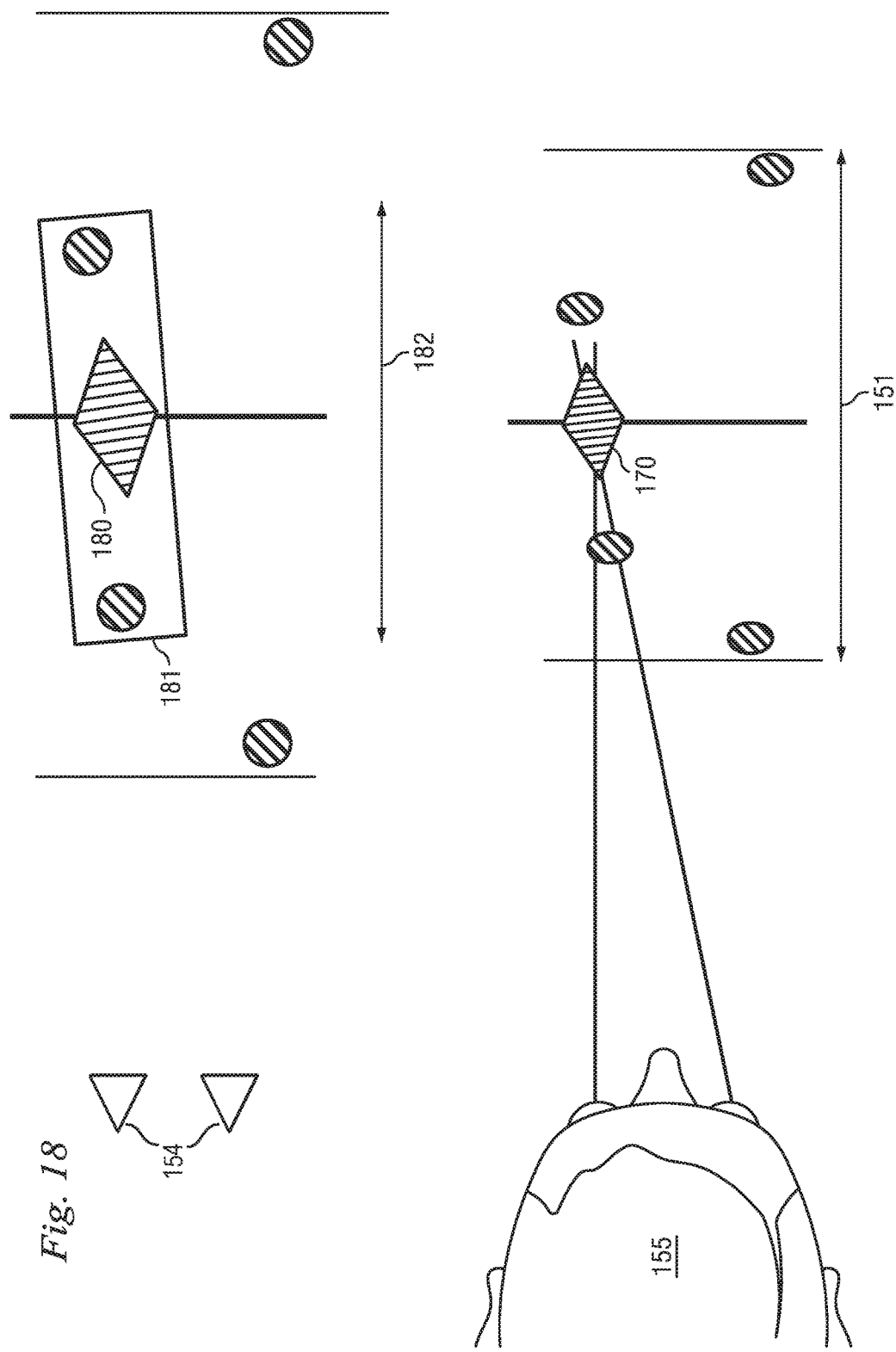
FIG. 18 is a schematic diagram illustrating one embodiment of an image controller's response, in accordance with the present disclosure.
Figure 19:
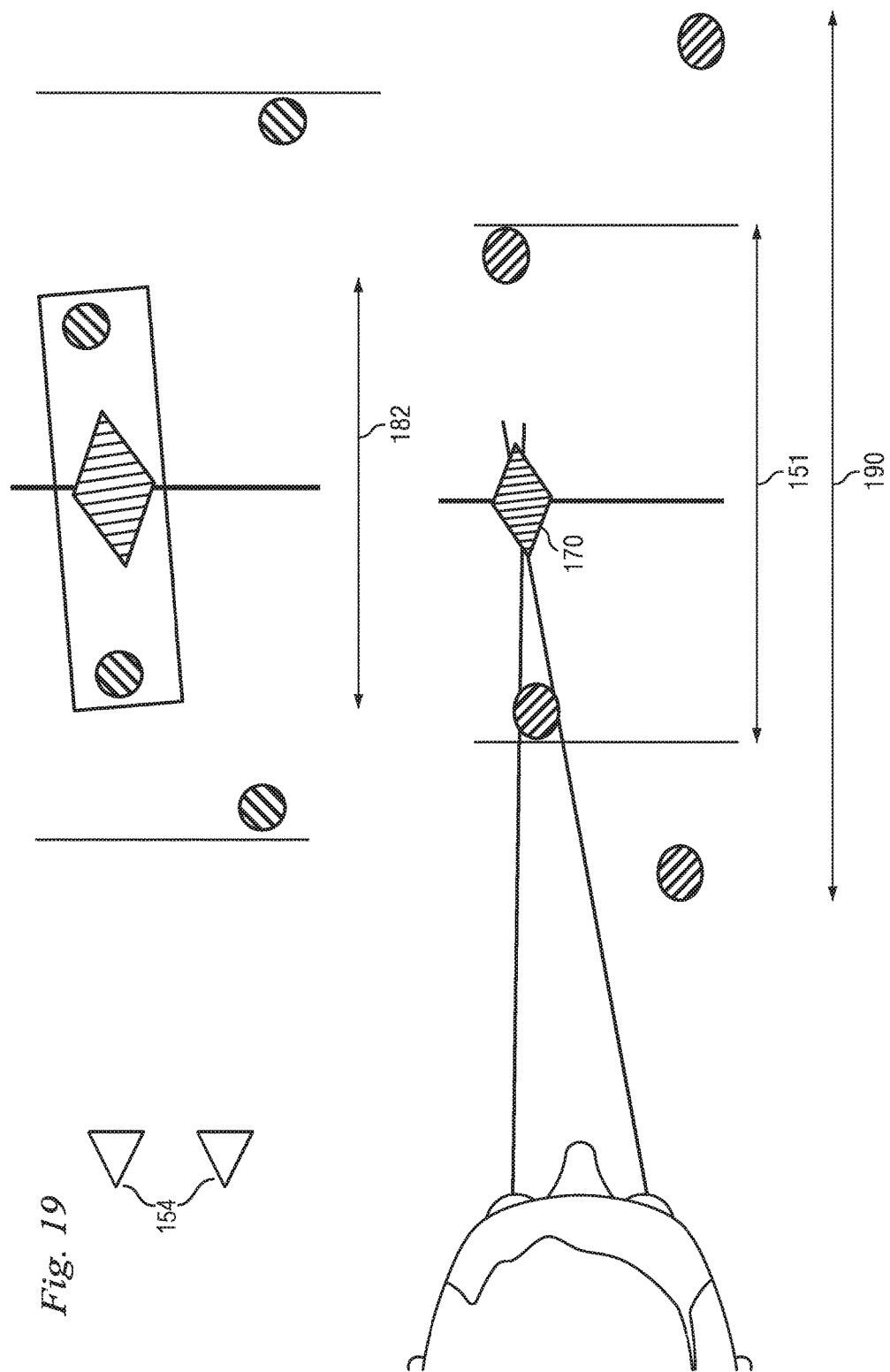
FIG. 19 is a schematic diagram illustrating one embodiment of an image controller's response, in accordance with the present disclosure.

FIGS. 17, 18 and 19 illustrate the image controller's response to a real time change in the viewer's region of binocular fixation $RBF_d$.

In FIG. 17 the $RBF_d$ has changed to a different position in the display space 170 as detected by the gaze-tracking element 6 and calculated by the image controller 10. The image controller 10 then calculates a new $RBF_S$ 180 as illustrated in FIG. 18 and additionally calculates a new RBI 181 that forms a volume of space that is a superset of the $RBF_S$ 180. Depending on the contents of the scene the new RBI may be larger, or smaller than that the current value. The scene depth range 182 to be mapped to the depth budget 151 will then also change. Once the scene depth range 182 is known, the application of any depth mapping camera control algorithm as generally discussed in U.S. Pat. No. 6,798,406, can map the newly calculated scene depth range 182 to the display perceived depth budget 151.

The result in FIG. 19 shows the new mapping of scene depth to depth budget. The technical benefit is that as the viewer's gaze moves around the scene, as displayed in the binocular image, the depth in the $RBF_d$ and corresponding RBI is continuously optimized to fit the available depth budget 151.

Of importance is that this embodiment will also operate in animated scenes where the RBI changes due to scene changes even when the $RBF_d$ region of binocular fixation does not change. This is measured by a depth measure element 156, which in computer graphics may be a depth buffer, or in photography, may be a range finder such as an optical or laser device.

Yet another embodiment may include a fixated region which may have preferred disparity and the surrounding region may have a different disparity where the total disparity does not exceed a predetermined limit using variable z-region mapping. This embodiment may provide a method in the image controller 10 that is able to alter the subsequently displayed images in response to the change in the viewer's region of binocular fixation 9, between the currently displayed binocular image and the subsequently displayed binocular image, with reference to FIGS. 26, 21, 22, 23, 24, and 25.

Figure 26:
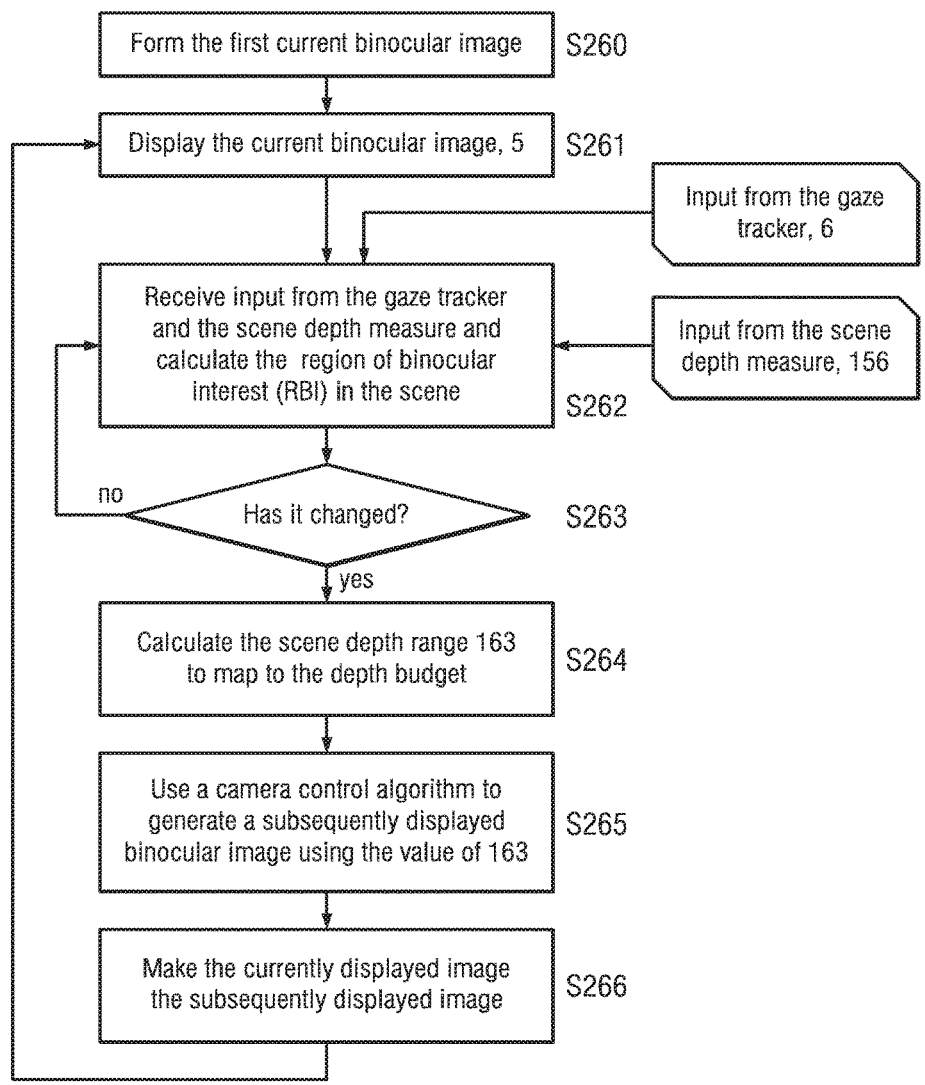
FIG. 26 is a schematic diagram illustrating a flow chart, in accordance with the present disclosure.

Referring to the flowcharts in FIG. 26 and FIG. 21. In step S260 a first binocular image is formed. This can be formed when a scene depth range 150, as shown in FIG. 15, is mapped to a perceived depth range 151 using a method as disclosed in references such as U.S. Pat. No. 6,798,406, U.S. Patent Application Pub. No. US 2011/7,983,477 or U.S. Pat. No. 8,300,089 both of which are herein incorporated by reference in their entirety. The first current binocular image is then displayed in step S261.

Figure 22:
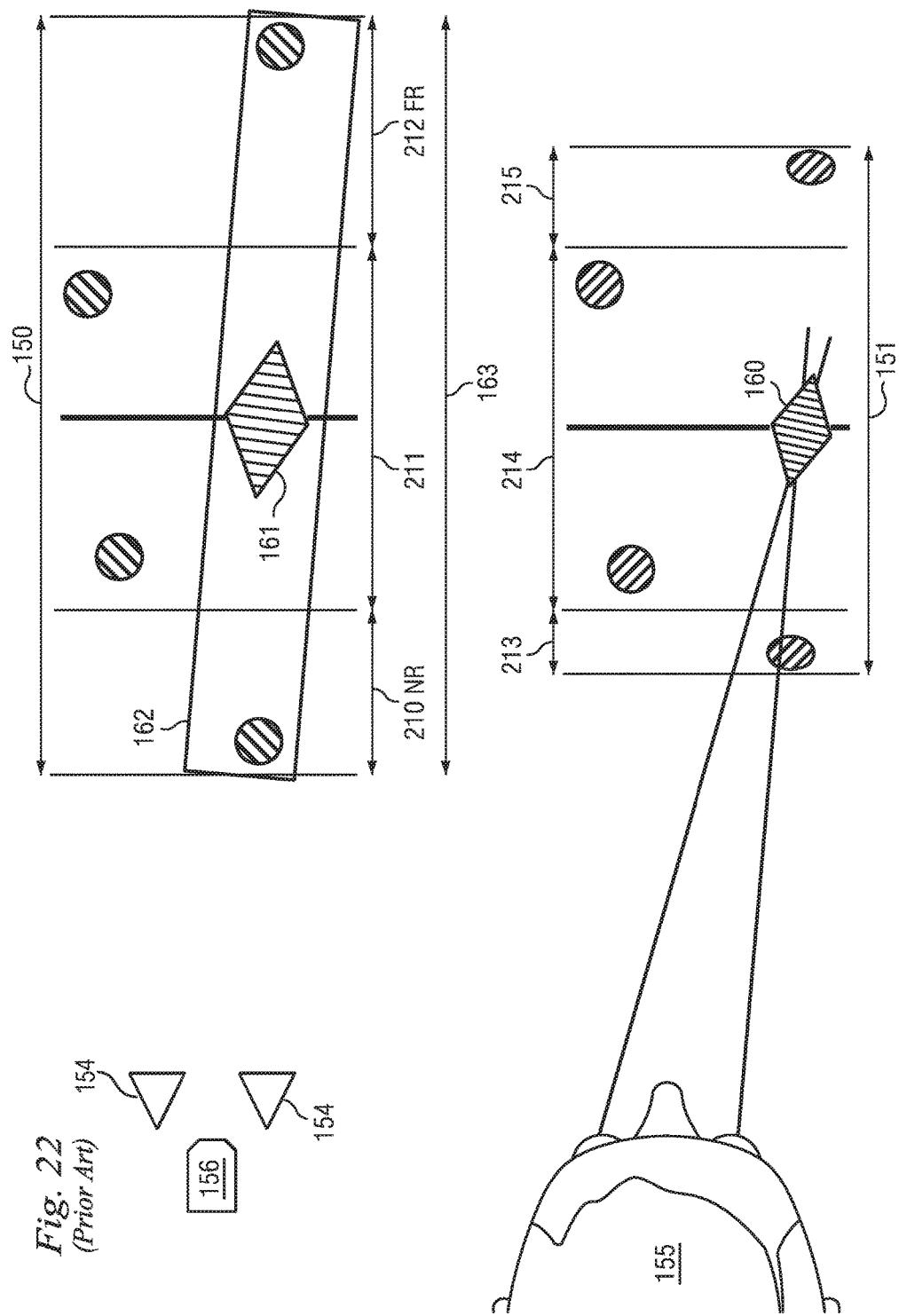
FIG. 22 is a schematic diagram illustrating one embodiment of scene depth range and perceived depth range, in accordance with the present disclosure.

Referring to FIG. 22, in step S262 the image controller receives input from the gaze tracker 6 this allows identification of the region of binocular fixation $RBF_d$ 160 in display space. From this, the region of binocular fixation in scene space $RBF_s$ 161 can be found and with additional input from the scene depth measurement element 156 the region of binocular interest RBI 162 in the scene can be calculated. Knowing the RBI or scene depth range 150, it is possible to calculate 163, which is the scene depth range 150 to be mapped to the perceived depth budget 151 in display space. In this instance 163 is approximately the same as the scene depth range 150, for example, the RBI has not changed, and so no change in the depth mapping is required and step S263 can return to step S262.

Figure 23:
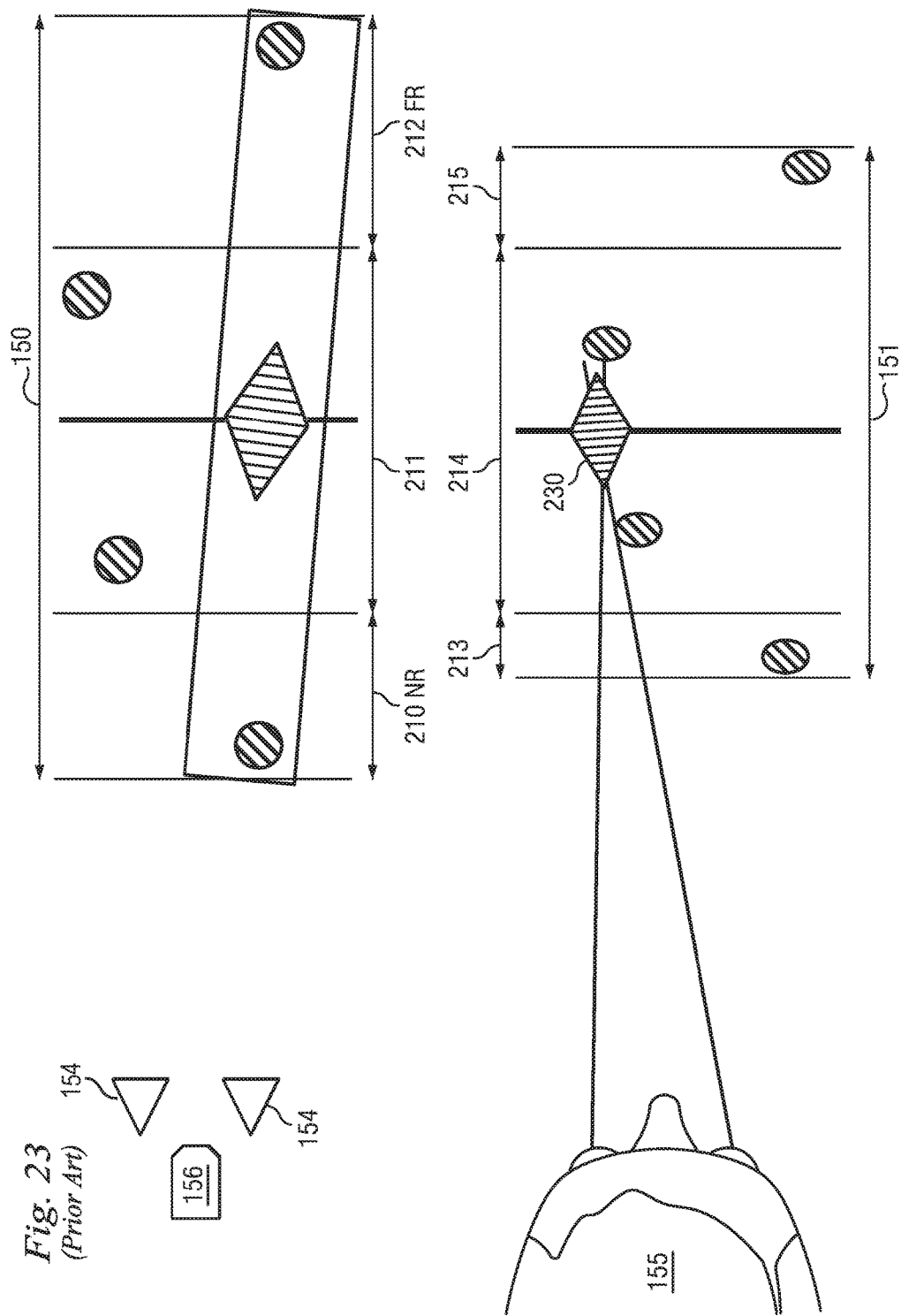
FIG. 23 is a schematic diagram illustrating one embodiment of scene depth range and perceived depth range, in accordance with the present disclosure.
Figure 24:
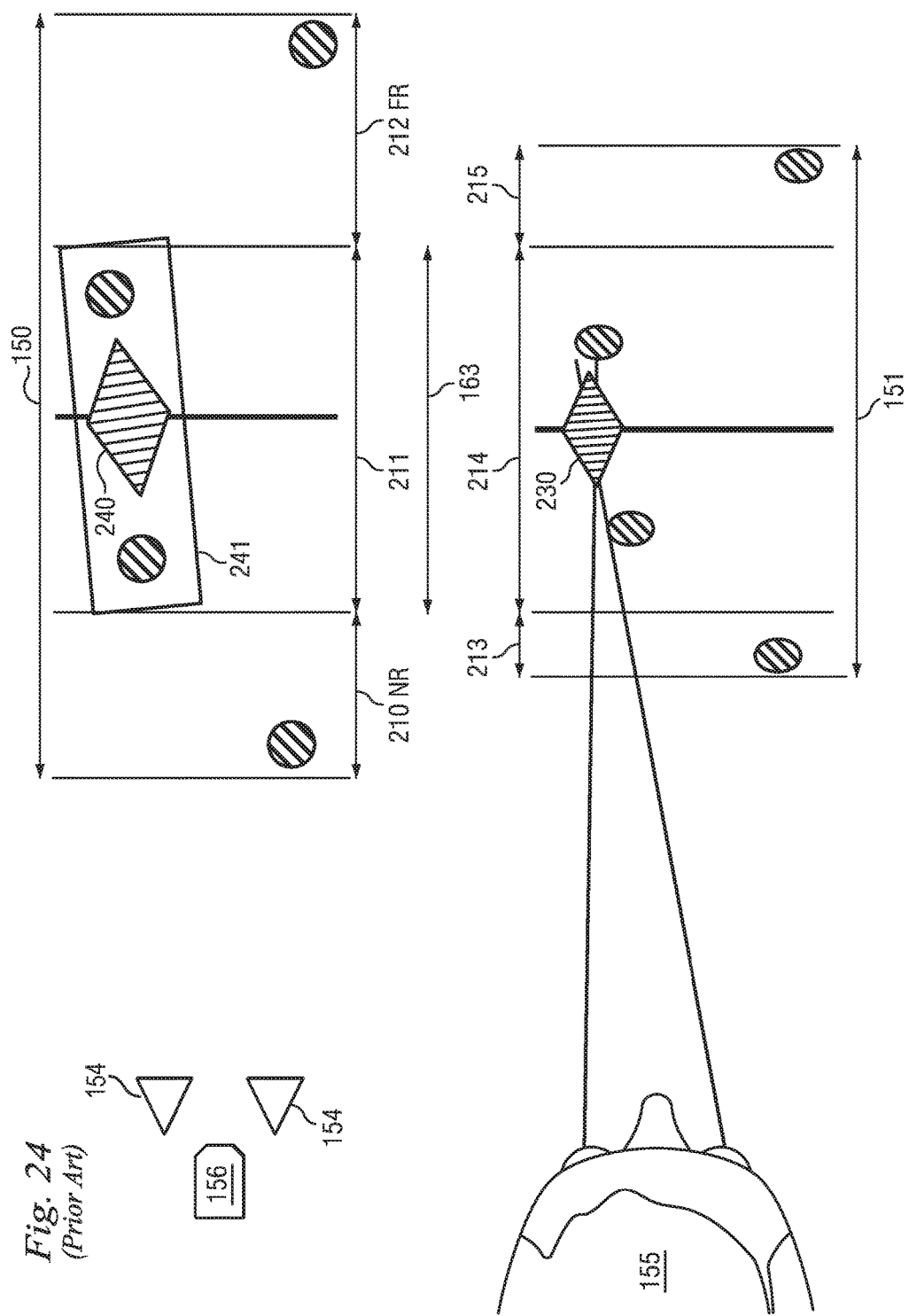
FIG. 24 is a schematic diagram illustrating one embodiment of scene depth range and perceived depth range, in accordance with the present disclosure.

Alternatively referring to FIG. 23, the viewer's gaze has changed and the input from the gaze tracker identifies a subsequent $RBF_d$ 230. Then as illustrated in FIG. 24 this allows a subsequent $RBF_s$ 240 to be calculated and from this the subsequent RBI 241. As the subsequent RBI 241 is now different from the current RBI 162 (as illustrated in FIG. 16), execution continues at step S264 and the subsequent scene depth range 163 is calculated.

Figure 25:
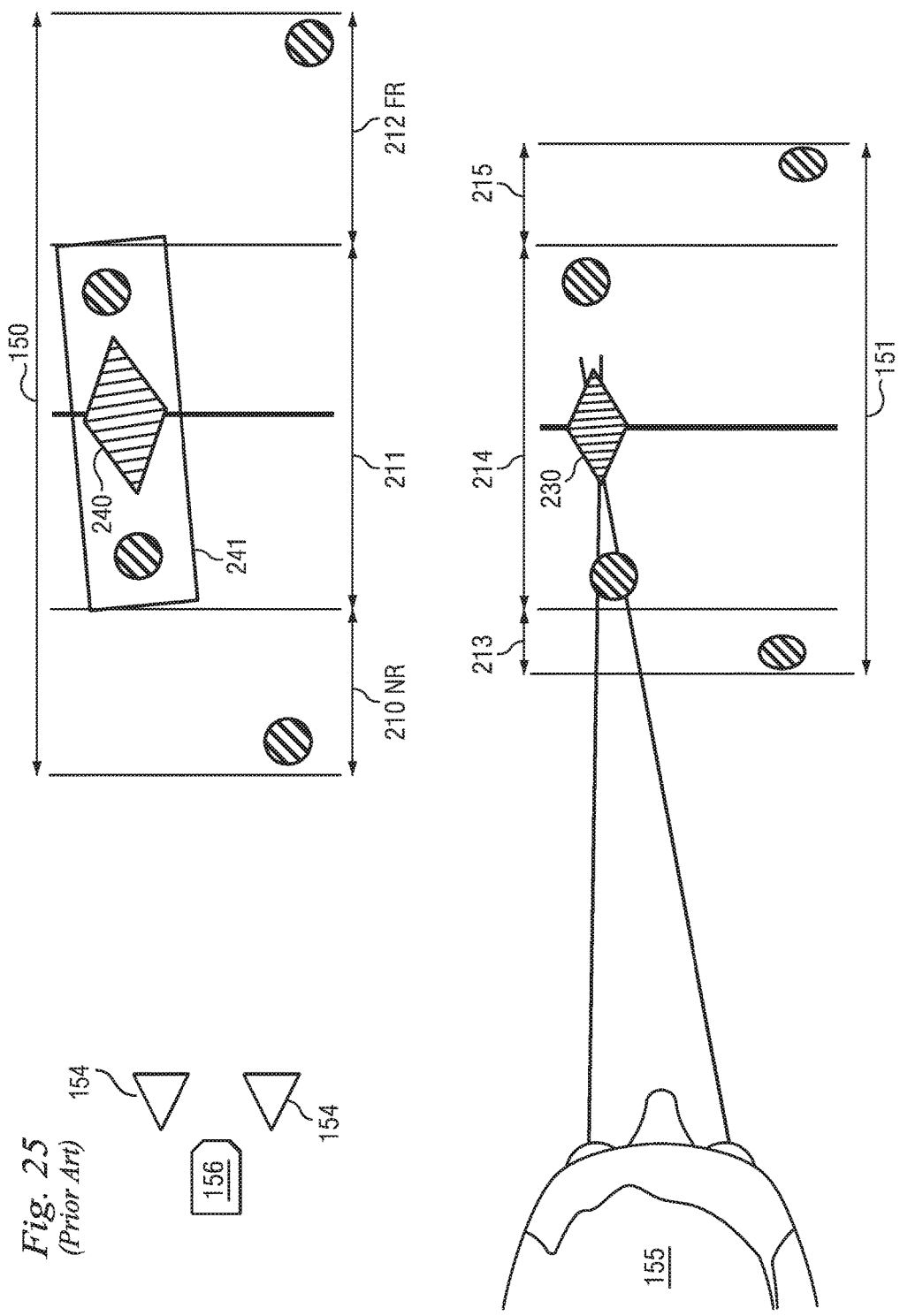
FIG. 25 is a schematic diagram illustrating one embodiment of scene depth range and perceived depth range, in accordance with the present disclosure.

Step S265 then calculates a new mapping of depth from the scene to the display space. FIG. 25 illustrates one way to implement the mapping for step S265 using a multi-region depth mapping algorithm such as generally disclosed in U.S. Pat. No. 7,983,477. Here the RBI can be considered as a region of interest 211 dividing the scene into three regions including a nearer region 210 and a further region 212. These are then mapped to three corresponding regions in the scene space, 213, 214, and 215. Because the regions 213, 214, and 215 may differ in the amount of perceived depth allocated to them, the region of interest 211 and hence the RBI can be given a preferential amount of scene depth compared to the near and far regions. Additionally it prevents any objects of the scene from appearing outside of the perceived depth range 151, such as for example, the single region mapping as illustrated in FIG. 19. Once the subsequent image is formed it is set to be the current image in step S266 and control return to step S261.

Yet another embodiment may include a fixated region which may have preferred disparity and the surrounding region may have a different disparity where the total disparity does not exceed a predetermined limit using variable camera parameters in one or two dimensions. This embodiment may provide a method in the image controller 10 that may alter the subsequently displayed images in response to changes in the viewer's region of binocular fixation 9 between the currently displayed binocular image and the subsequently displayed binocular image, with reference to FIGS. 27, 28, 29, and 30.

Figure 14:
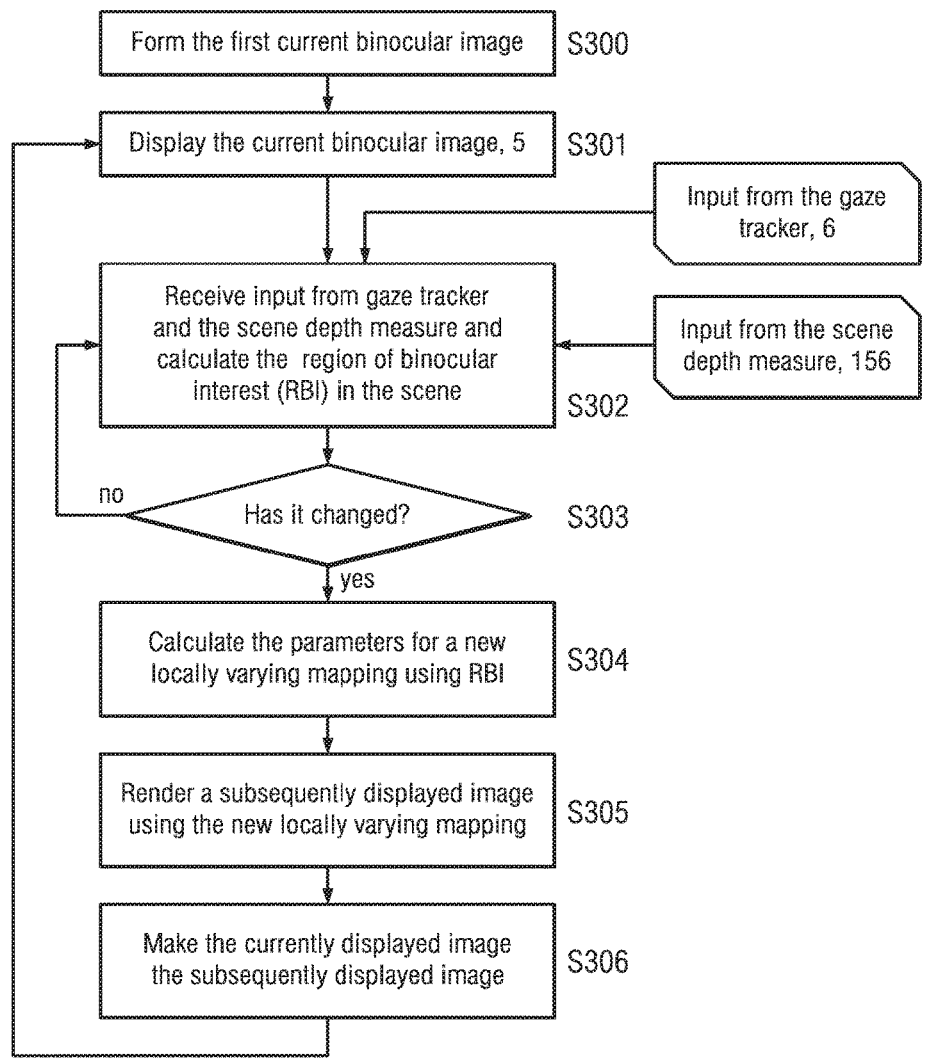
FIG. 14 is a schematic diagram illustrating a flow chart, in accordance with the present disclosure.

In FIG. 14, the flowchart step S300 forms a first binocular image. This image may be formed when a scene depth range 150 is mapped to a perceived depth range 151 using a method as disclosed in references such as U.S. Pat. Nos. 6,798,406, 7,983,477, or 8,300,089. The current binocular image 5 is displayed in step S301.

Referring to FIG. 14, in step S302, the image controller receives input from the gaze tracker 6 and this may allow identification of the region of binocular fixation $RBF_d$ 160 in display space. From this, the region of binocular fixation $RBF_s$ 161 in scene space can be found and with additional input from the scene depth measurement element 156 the region of binocular interest RBI 162 in the scene can be calculated. Knowing the RBI it is possible to calculate 163 the scene depth range to be mapped to the perceived depth range 151 in display space. If the RBI has not changed no change in the depth mapping is required and step S303 returns to S302.

Figure 27:
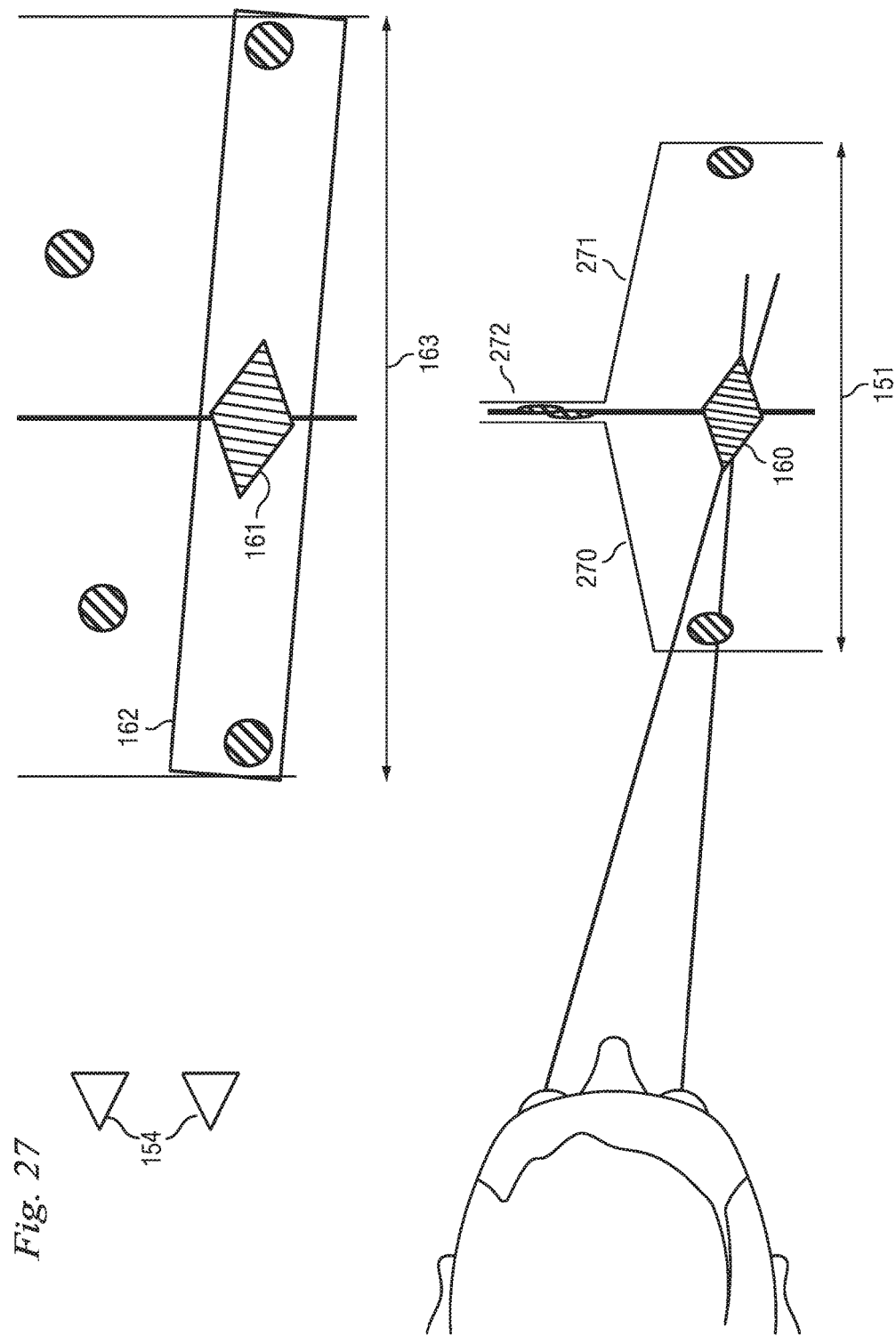
FIG. 27 is a schematic diagram illustrating one embodiment of scene depth range and perceived depth range, in accordance with the present disclosure.

Referring to FIG. 27, when an RBI has been identified, a locally varying depth mapping from scene space to display space can be calculated in S304. This can vary the stereoscopic camera parameters used to capture the image. For example, a full stereoscopic 3D effect near the RBI may change to a simple 2D effect outside the RBI, as illustrated in FIG. 27.

Figure 28:
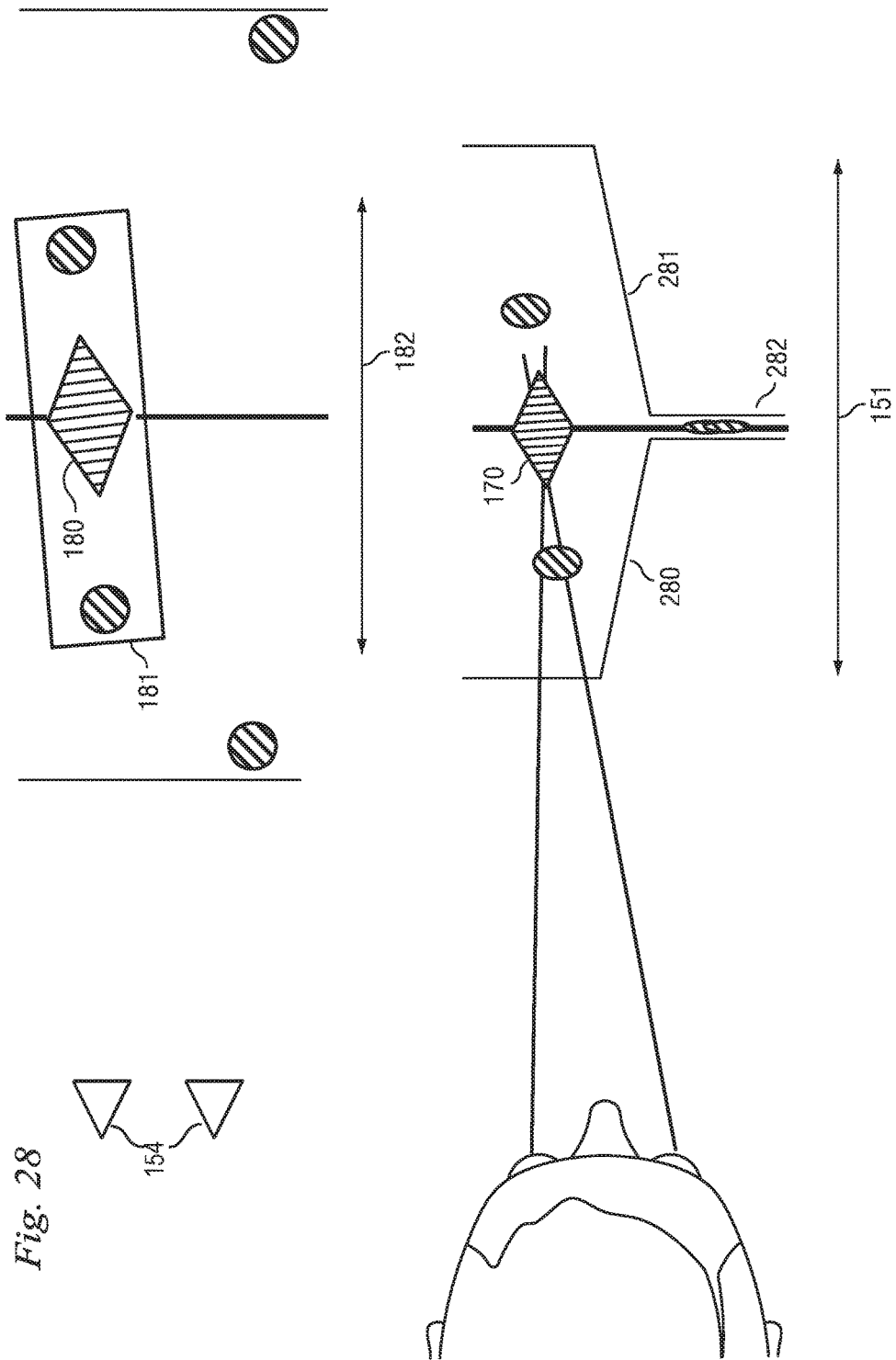
FIG. 28 is a schematic diagram illustrating one embodiment of a scene depth range and perceived depth budget.

If the RBI changes, as shown in FIG. 28, then the region of the image with full stereoscopic 3D effect can be changed too. The benefit becomes any region of the displayed image away from the RBI may be rendered from a single camera viewpoint, saving the computational costs of rendering two images while keeping the foveated region at the highest possible quality.

Figure 29:
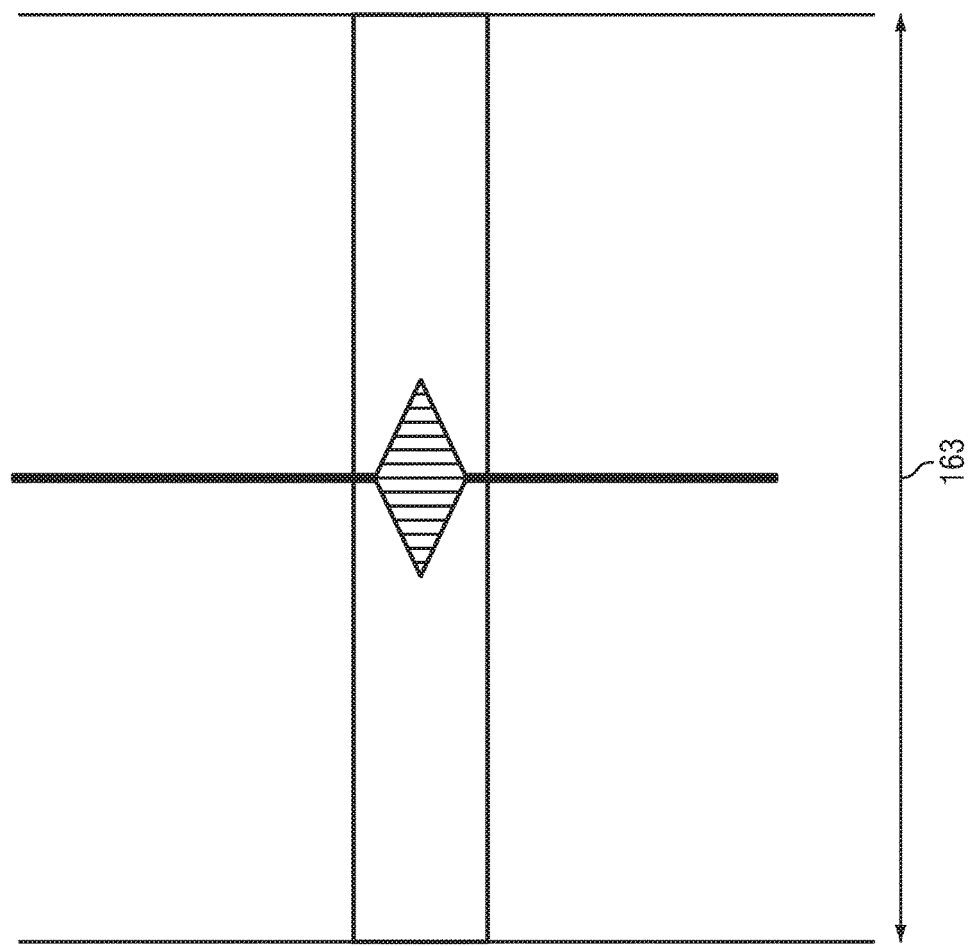
FIG. 29 is a schematic diagram illustrating one embodiment of an image system, in accordance with the present disclosure.

FIG. 29 illustrates how the camera parameters used for rendering in step S305 can vary in one dimension depending where in the stereoscopic image, different scene elements may appear. In this case elements away from the RBI may be rendered from a single central camera viewpoint C, while elements in the RBI are rendered with a stereoscopic camera setting $A_0$, which may be calculated using methods as generally discussed in U.S. Pat. No. 6,798,406. In the zone between the full stereoscopic and the two-dimensional image regions the camera setup is linearly interpolated, with the interaxial separation $A_1$ reducing until the individual use of the single central camera C is appropriate.

A further embodiment of this approach is to vary the camera parameters with vertical as well as horizontal element position, so that the regions of the image that are horizontally and vertically close to the RBI, are rendered with full stereoscopic effect.

One possible implementation of these embodiments is illustrated in Listing 1 which provides an outline of a GLSL, as generally discussed in *OpenGL Reference Pages*, at http://www.opengl.org/documentation/glsl/, a vertex shader solution for interpolating the camera parameters appropriate for projecting and shading vertices in a real time computer graphics system, in order to produce a foveated stereoscopic rendering effect.

Listing 1:

```
1    // Listing 1, Method for 1D and 2D foveated stereoscopic cameras using GLSL.
2    // This method is called once to draw left picture and once for right picture.
3
4    in vec4 inPosition, inNormal; // Input information about each vertex.
5    out vec4 vsColor; // Output colour for per-vertex shading.
6
7    uniform mat4 modelMatrix; // Model transformation is common to all views.
8
9    uniform mat4 viewMatrix, projectionMatrix; // Left or right stereoscopic camera position.
10   uniform mat3 normalMatrix;
11
12   uniform mat4 cViewMatrix, cProjectionMatrix; // Centre view camera position.
13   uniform mat3 cNormalMatrix;
14
15   uniform float rABound; // Scene space boundary to start cross fading.
16
17   // The scene space origin of the foveated region.
18   uniform float originX, originY;
```

-continued

Listing 1:

```
19
20   uniform vec3 lightDirection; // Used to calculate shaded colour at the vertex.
21   uniform vec4 lightColor, ambientColor;
22
23   void main(void)
24   {
25       vec3 normal, normLightDir;
26
27       float vertX, vertY;
28       vec4 vmPosition ;
29       float fadeZone = 30.0; // Width of cross fade region.
30
31       float weight, invWeight, weighty, invWeightY ;
32
33       mat4 MVPMat;
34       mat4 cMVPMat;
35
36       mat4 weightedMVPMat;
37       mat3 weightedNormMat;
38
39       vmPosition = (cViewMatrix * modelMatrix) * inPosition;
40       vertX = abs( vmPosition.x + originX );
41       vertY = abs( vmPosition.y + originY );
42
43       weight = (vertX - rABound) / fadeZone ;
44       weightY = (vertY - rABound) / fadeZone ;
45
46       weight = max( weight, 0.0 ) ; // Calculate weight in X direction.
47       weight = min( weight, 1.0 ) ;
48       weightY = max( weightY, 0.0 ) ; // Calculate weight in the Y direction.
49       weightY = min( weightY, 1.0 ) ; //
50       weight = max( weight, weightY ); // Choose to use max of X and Y weights.
51       invWeight = 1.0 - weight; // NB 1.0 == (weight + invWeight )
52
53       // Calculate weighted transformation matrix for the surface normal.
54       weightedNormMat = (invWeight * normalMatrix) + (weight * rANormalMatrix) ;
55       normal = weightedNormMat * inNormal;
56       normal = normalize( normal );
57       normLightDir = normalize( lightDirection );
58
59       // Output vertex colour using weighted normal projection and a diffuse lighting model.
60       vsColor = ambientColor * 0.3 + lightColor * max(dot(normal, normLightDir), 0.0);
61
62       // Calculate weighted projection matrix for the vertex geometry.
63       MVPMat = projectionMatrix * viewMatrix * modelMatrix ;
64       cMVPMat = cProjectionMatrix * cViewMatrix * modelMatrix ;
65       weightedMVPMat = (invWeight * MVPMat) + (weight * cMVPMat) ;
66
67       // Output the projected vertex position using the weighted MVP matrix.
68       gl_Position = weightedMVPMat * inPosition;
69   }
```

The shader described in Listing 1 is called once for the left eye view and once for the right eye view. Lines 4 through 21 declare the variables that are set before the shader runs. Additionally, lines 9 and 10 describe the camera parameters needed for a left or right eye position. Lines 12 and 13 describe the camera parameters for a single central monoscopic view. Also, lines 25-37 declare the variables that may be used during the calculations of the foveated camera parameters.

Of note are the variables rABound on line 15 and the fadeZone on line 29, which in combination with the foveated region origin given by originX and originY on line 18, primarily determine the position and extent of the foveated region where stereoscopic rendering will be implemented. At the boundary of this region given by rABound the camera parameters will be interpolated over a scene distance primarily determined by fadeZone to become a monoscopic image.

The appropriate weighting to do this is calculated between lines 39 and 51. Note, if the weight value calculated has a value of 1.0 then the monoscopic zone has been reached and the calculations between lines 53 and 68 may be calculated once for the left camera and not the right camera view. Resulting in substantial computational savings compared to calculating the projection and shading calculations separately for both eyes.

Where these calculations are appropriate, for the foveated stereoscopic zone and for one camera's view in the monoscopic zone then:

a. Lines 53-60 describe how the surface normal vectors are transformed using the weighted normal transformation matrix and then used to calculate a shaded color value for the vertex using for illustration a single light Lambertian shading model.

b. Lines 62-68 describe how the vertex position is transformed using the weighted model-view-projection matrix.

The resulting shaded color vsColor and the transformed vertex position gl_Position are passed onto the next stage in the computer graphics rendering pipeline.

Yet another embodiment may include a fixated region which may have preferred disparity and the surrounding region may have a different disparity in which the total disparity does not exceed a predetermined limit using variable camera parameters in three dimensions. Using a trilinear interpolation model to calculate the weight value will allow the depth dimension to be foveated as well as the two image dimensions. This can be implemented using a camera model as described in U.S. Pat. Nos. 7,983,477 or 8,300,089 in which the mapping of the depth dimension is variable.

The benefit may include optimizing the depth presentation of the image seen in the foveated region while reducing the computational or depth budget demands for drawing the image regions representing the scene in-front and behind this region in depth. For example, in a driving game the best image quality is given to the region of the scene to which the driver is attending.

Another embodiment may have a fixated region which may have preferred disparity and the surrounding region may have a different disparity in which the total disparity does not exceed a predetermined limit by any of the above methods and multiple fixated regions are computed to allow multiple gaze-tracked viewers to watch the same screen and attend to different parts of the screen. For example, if there are multiple viewers of the same screen then the multiple viewers are general unlikely to be fixating on the same region of the image. This can be solved with multiple gaze tracking devices, for example each wearing a head mounted Eye Link II eye tracker from SR Research Ltd., Mississauga, Ontario, Canada. Using the eye tracking information, each viewers' RBI can be calculated and used to determine the individual weights used to control the camera parameters across the screen.

Continuing this discussion, this embodiment enables multiple viewers to look at a gaze tracked image and although temporally varying the regions of interest are often similar enough between viewers, as generally disclosed in *Active Vision*, Findlay and Gilchrist, OUP, 2003, this may result in savings in image regions to which none of the viewers may attend.

Further, in yet another embodiment, a fixated region may have preferred disparity and the surrounding region may have a different disparity in which the total disparity does not exceed a predetermined limit by any of the above methods and the disparity is temporally modified to distinguish the region or a part of one of the regions. In the example utilizing temporal disparity modification a viewer relocates their fixation to a region of interest and then after a period the disparity in the region of fixation is altered to introduce a noticeable depth alteration. In turn this introduces a detectable change in the convergence and/or divergence of each eye allowing the eyes mean fixation point to be calculated.

Continuing this discussion, this can be used to provide an embodiment for user interfaces in which the icons on a desktop are given differential depth within a finite but coarse fixation region. One icon may then be temporally modified. If differential changes in convergence and/or divergence of the eyes is detected it can then be inferred that the eyes are fixating the varying icon.

When the eyes differential change in convergence is detected the icon could then be primed for selection. Once an icon is primed in this way the viewer can activate the primed icon by pressing a button, long fixation, blinking, any combination thereof, and so forth.

A further enhancement can allow the system to dynamically adapt to the user, if the system does not detect any change in eye convergence and/or divergence it can alter which icon is varied in disparity and eventually prime a specific icon when it eventually detects a temporal change in eye convergence.

The benefit of temporally altering the disparity here is to use the induced temporal changes in eye convergence and/or divergence to increase the overall system confidence in regards to which icon is being attended too.

Further, temporal disparity modification might not be continuous. An alternative use of the temporal variation in disparity may be to attract attention to regions of a binocular image. In this case regions outside the region of attention can be varied to attract the viewer to attend to them, for example because of the looming effect as generally discussed in *Basic Vision*, Snowden, Thompson, Troscianko, OUP, 2006.

A direct benefit of this is in warning systems in which there is a need for the viewer's attention to be drawn to urgent information in a region outside their current region of fixation. In this case, the disparity of a warning icon outside the region of interest is varied temporally. One example of such an icon may be a low battery warning indicator. Although it is unlikely that it would be in the viewer's region of fixation, it is important to draw the viewer's attention to the icon when the battery is lower than a predetermined capacity remaining. It may be evident to those skilled in the art that there are many other icons in which this may benefit in many types of information presentation systems Yet another embodiment may include a fixated region which may have preferred disparity and the surrounding region may have a different disparity in which the total disparity does not exceed a predetermined limit by any of the above methods and one or more of the following image quality parameters are also varied. The varied image quality parameters are listed below.

The first image quality parameter that may be varied is color quality in terms of bits per pixel, or other color representation scheme. This may benefit the highlighting of certain areas using enhanced or reduced color representations and the benefit of reduced color computation time and/or energy saving in the GPU and/or reduced display bandwidth in those areas of reduced color representations.

Another image quality parameter that may be varied is grey level quality in terms of bits per pixel, or other grey level representation scheme. This may provide the benefit of highlighting certain areas using enhanced or reduced grey level representations and the benefit of reduced grey level computation time and/or reduced display bandwidth in those areas of reduced grey level representations.

Another image quality parameter that may be varied is image luminance in terms of total light power, for example, by using less of the display brightness range, or by using a high dynamic range display with an ability to boost brightness in a particular region of an image. This has benefits including, but not limited to, reduced power usage in regions of the screen with lower brightness and lower visibility of high frequency image artifacts such as aliasing in the lower brightness regions of the image when lower resolution image content is used.

Another image quality parameter that may be varied is image contrast, for example, by changing the gamma curve of the displayed image. This has the benefit of masking the visibility of other performance changes. For example, reduced resolution can result in blockiness in the image which can be masked with a low pass filter.

Another image quality parameter that may be varied is image spatial frequency content, for example, using high, low or band pass filters. In one example, regions can be blurred to reduce computation and reduce spatial resolution that may be appropriate in some regions of the image. This may contribute to reducing computational demands in regions of the screen with lower spatial frequency.

Another image quality parameter that may be varied is image temporal frequency using higher or lower image refresh rates in different areas of the screen. This may contribute to reducing computational and display bandwidth conditions in regions of the screen with lower temporal frequency.

Another image quality parameter that may be varied is scene geometry content in which the quality of the computer graphics model is varied by changing the quality of geometric model used to represent objects. This may contribute to reducing computational bandwidth conditions in regions of the screen with reduced quality geometric models, for example, lower number of triangles in geometry meshes.

Another image quality parameter that may be varied is scene texture image content in which the quality of the computer graphics model texture images is varied. This may contribute to reducing computational bandwidth conditions in regions of the screen with reduced quality texture images, for example lower resolution images.

Another image quality parameter that may be varied is computer graphics rendering parameters so that effects including specular highlights, reflection, refraction, transparency vary in quality between the image regions. This may contribute to reducing computational bandwidth conditions in regions of the screen with reduced graphics effects.

Another image quality parameter that may be varied is disparity gradient in terms of maximum gradient allowed in one region compared to another region. This may contribute to improving perceived image quality in image regions in which disparity gradient may otherwise be too high to fuse the images comfortably, or so high that it may be detrimental to task performance.

As discussed herein and in at least one embodiment, binocular fixation may be a volume in space around the point of intersection of the two optical axes of the eyes.

As discussed herein and in one at least one embodiment, binocular image may be a pattern of light that generates separate stimulus for the two eyes. This may include multiple resolvable views in different directions over each pupil. It can, for example, be generated using discrete views or continuous wave fronts, technically produced using stereoscopic, auto-stereoscopic, multiscopic or holographic optical devices.

As discussed herein and in at least one embodiment, a binocularly fused image may be a perceptually single view (cyclopean view) of the world formed by fusing two images. This may provide a sensation of (perceived) depth in the scene.

As discussed herein and in at least one embodiment, capture may be a process that generates a binocular image from the real world or synthetic data. The binocular image may be using optical functions such as still or motion cameras, or rendered using computer graphics or other image synthesis mechanisms.

As discussed herein and in at least one embodiment, depth budget may be a range of perceived depth, implying a range of binocular disparity that has been chosen as the total limit of perceived depth seen in a binocularly fused image. The depth budget may be chosen for comfort or technical reasons.

As discussed herein and in at least one embodiment, depth mapping may be the process of capturing depth from a scene and reproducing it as perceived depth in a binocular image.

As discussed herein and in at least one embodiment, depth measurement or depth measurement element may be a mechanism, real or virtual, for measuring distance, depth, of a surface from a fixed point. In the real world scenes this may be a laser rangefinder, an optical range finder, and so forth. In synthetic scenes this may be a depth map, or a geometric calculation that measures the distance from a fixed point. In most or all cases the depth measurements may be relative to camera position and may be used to calculate a depth mapping from scene space to the perceived image space.

As discussed herein and in at least one embodiment, gaze tracking may include methods for following the eyes movements to determine the direction of gaze. These can be implemented with devices that employ direct contact with the eye or are remote measurement elements that, for example, follow reflections of light from the eye.

As discussed herein and in at least one embodiment, foveated images may be an image that is perceived in the foveal region of the retina.

As discussed herein and in at least one embodiment, a foveated region may be a region is an image or a scene that is perceived in the foveal region of the retina.

As discussed herein and in at least one embodiment, an image may be a pattern of light that can be detected by the retina.

As discussed herein and in at least one embodiment, disparity may be a difference in the location of a point, normally horizontal, in which horizontal is taken to be defined by the line joining the two eyes and the disparity is measured on the retina.

As discussed herein and in at least one embodiment, a monoscopic image may be an image that is substantially the same when viewed from any direction. If presented to both eyes, both eyes receive substantially the same pattern of light. For example, a standard 2D TV presents a monoscopic stimulus, each pixel broadcasts the substantially similar or the same light in all viewing directions.

As discussed herein and in at least one embodiment, a region of binocular fixation in display space may be $RBF_d$ or a volume in display space that corresponds to the region of overlap of the gaze zones of the two eyes.

As discussed herein and in at least one embodiment, a region of binocular fixation in scene space may be $RBF_s$ or a volume in scene space that corresponds to the region of overlap of the gaze zones of the two eyes.

As discussed herein and in at least one embodiment, a region of binocular interest may be an RBI or a volume of scene space that includes the region of binocular fixation and is extended to include the scene limited by the gaze zones of the two eyes.

As discussed herein and in at least one embodiment, scene depth range may be a range of depth measured in the scene, usually that may be mapped to a range of perceived depth in a fused binocular image.

As discussed herein and in at least one embodiment, a stereoscopic image may be an image that includes a pair of images that are presented separately to each eye. The implication is that the position of each of the viewer's eyes is important when viewing a stereoscopic image as a different pattern of light is received on the two retinas.

As discussed herein and in at least one embodiment, rendering may be the process of creating an image from a synthetic scene.

As discussed herein and in at least one embodiment, synthetic scenes may be scenes in a computer graphics, virtual world or depth-based image that may be physically real, though my represent physically real scenes.

As discussed herein and in at least one embodiment, a view may be a unique image visible in a single direction.

As discussed herein and in at least one embodiment, a scene may be a real world or synthetic scene which is being captured and then reproduced as a binocular image.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

It should be noted that embodiments of the present disclosure may be used in a variety of optical systems. The embodiment may include or work with a variety of projectors, projection systems, optical components, computer systems, processors, self-contained projector systems, visual and/or audiovisual systems and electrical and/or optical devices. Aspects of the present disclosure may be used with practically any apparatus related to optical and electrical devices, optical systems, display systems, presentation systems or any apparatus that may contain any type of optical system. Accordingly, embodiments of the present disclosure may be employed in optical systems, devices used in visual and/or optical presentations, visual peripherals and so on and in a number of computing environments including the Internet, intranets, local area networks, wide area networks and so on.

Regarding the disclosed embodiments in detail, it should be understood that the embodiment is not limited in its application or creation to the details of the particular arrangements shown, because the embodiment is capable of other arrangements. Moreover, aspects of the embodiment may be set forth in different combinations and arrangements to define embodiments unique in their own right. Also, the terminology used herein is for the purpose of description and not of limitation.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A method for varying binocular image content, comprising:
    displaying a current binocular image comprising left and right eye views, wherein the left and right eye views each comprise a first portion of respective left and right eye source images;
    using inputs from the current binocular image and a gaze tracker to calculate a subsequent region of binocular fixation;
    determining any change in binocular fixation between a current region of binocular fixation and the subsequent region of binocular fixation;
    calculating a disparity range of the subsequent region of binocular fixation when there is a change in binocular fixation between the current region of binocular fixation and the subsequent region of binocular fixation;
    determining whether the disparity range is substantially zero;
    choosing new left and right eye views to create a subsequently displayed binocular image when the disparity range is not substantially zero, wherein a nearest object in the subsequent region of binocular fixation has a disparity of substantially zero in the subsequently displayed binocular image, and wherein the new left and right eye views each comprise a second portion of the respective left and right eye source images, wherein the first and second portions of the left eye source image are different portions, and the first and second portions of the right eye source image are different portions; and
    making the currently displayed image, the subsequently displayed binocular image.

2. The method for varying binocular image content of claim 1, further comprising receiving a second input from the gaze tracker and using the second input from the current binocular image and the gaze tracker to re-calculate the subsequent region of binocular fixation when the subsequent region of binocular fixation has not substantially changed, and if it is determined that the subsequent region of binocular fixation, after re-calculation, has changed, then calculating the disparity range of the subsequent region of binocular fixation.

3. The method for varying binocular image content of claim 1, further comprising receiving a third input from the gaze tracker and using the third input from the current binocular image and the gaze tracker to further re-calculate the subsequent region of binocular fixation when the disparity range is approximately zero, and if it is determined that the subsequent region of binocular fixation, after further re-calculation, has changed, then re-calculating the disparity range of the subsequent region of binocular fixation.

4. The method for varying binocular image content of claim 1, further comprising determining, with the gaze tracker, the disparity within the fixated region, wherein the gaze tracker determines the plane of fixation from the difference between left eye and right eye screen fixation points.

5. The method for varying binocular image content of claim 1, wherein determining whether the disparity range is substantially zero further comprises comparing the image disparity of the subsequent object with zero, wherein the subsequent object is being imaged where it is the closest object to a viewer in the region of binocular fixation.

6. The method for varying binocular image content of claim 1, further comprising altering a subsequently displayed image in response to the change in the region of binocular fixation between the currently displayed binocular image and the subsequently displayed binocular image.

7. The method for varying binocular image content of claim 1, further comprising forming a currently displayed binocular image.

8. The method for varying binocular image content of claim 1, wherein forming a currently displayed binocular image further comprises estimating a 3D region of fixation and projecting the 3D region of fixation into an image plane to form a binocular region of fixation.

9. The method for varying binocular image content of claim 8, wherein the currently displayed binocular image is formed as a left image and a right image.

10. The method for varying binocular image content of claim 9, wherein the currently displayed binocular image is selected from a larger source image.

11. The method for varying binocular image content of claim 1, further comprising receiving a second input from the gaze tracker and using the second input from the current binocular image and the gaze tracker to re-calculate the subsequent region of binocular fixation when the disparity range is approximately zero, and if it is determined that the subsequent region of binocular fixation, after re-calculation, has changed, then re-calculating the disparity range of the subsequent region of binocular fixation.

12. A binocular imaging system, comprising:
a display configured to display a current binocular image having left and right eye views, wherein the left and right eye views each comprise a first portion of respective left and right eye source images;
a gaze tracker that identifies at least one or both gaze directions of the left eye and the right eye; and
an image controller configured to use input from the current binocular image and input from a gaze tracker to calculate a subsequent region of binocular fixation, and to determine any change in binocular fixation between a current region of binocular fixation and the subsequent region of binocular fixation, and to calculate a disparity range of the subsequent region of binocular fixation when there is a change in binocular fixation, and to determine whether the disparity range of the subsequent region of binocular fixation is substantially zero, and to choose new left and right eye views to create a subsequently displayed binocular image when the disparity range is not substantially zero, wherein a nearest object in the subsequent region of binocular fixation has a disparity of substantially zero in the subsequently displayed binocular image, and wherein the new left and right eye views each comprise a second portion of the respective left and right eye source images, wherein the first and second portions of the left eye source image are different portions, and the first and second portions of the right eye source image are different portions, and to make the currently displayed image, the subsequently displayed binocular image.

13. The binocular imaging system of claim 12, wherein the image controller is configured to receive a second input from the gaze tracker and using the second input from the current binocular image and the gaze tracker to re-calculate the subsequent region of binocular fixation when the subsequent region of binocular fixation has not substantially changed, and the image controller is configured to calculate the disparity range of the subsequent region of binocular fixation, if it is determined that the subsequent region of binocular fixation, after re-calculation, has changed.

14. The binocular imaging system of claim 13, wherein the image controller is configured to receive a third input from the gaze tracker and using the third input from the current binocular image and the gaze tracker to further re-calculate the subsequent region of binocular fixation when the disparity range is approximately zero, and the image controller is configured to re-calculate the disparity range of the subsequent region of binocular fixation, if it is determined that the subsequent region of binocular fixation, after further re-calculation, has changed.

15. The binocular imaging system of claim 12, wherein the image controller is configured to receive a second input from the gaze tracker and using the second input from the current binocular image and the gaze tracker to re-calculate the subsequent region of binocular fixation when the disparity range is approximately zero, and the image controller is configured to re-calculate the disparity range of the subsequent region of binocular fixation, if it is determined that the subsequent region of binocular fixation, after re-calculation, has changed.

16. The binocular imaging system of claim 12, wherein the gaze tracker is configured to determine the disparity within the fixated region and the plane of fixation from the difference between left eye and right eye fixation points.

17. The binocular imaging system of claim 12, wherein the image controller is configured to determine whether the disparity range is substantially zero by comparing the image disparity of the subsequent object with zero, wherein the subsequent object is being imaged where it is the closest object to a viewer in the region of binocular fixation.

18. The binocular imaging system of claim 12, wherein the image controller is configured to form a currently displayed binocular image by estimating a 3D region of fixation and projecting the 3D region of fixation into an image plane to form a binocular region of fixation.

* * * * *